(12) United States Patent
Therien et al.

(10) Patent No.: US 11,117,911 B2
(45) Date of Patent: Sep. 14, 2021

(54) PHOTO-OXIDANTS FOR ENERGY CONVERSION AND CATALYSTS AND SYSTEMS AND METHODS OF USING SAME

(71) Applicant: Duke University, Durham, NC (US)

(72) Inventors: Michael Therien, Durham, NC (US); Ting Jiang, Durham, NC (US); Nicholas Polizzi, Durham, NC (US); Jeffrey Rawson, Durham, NC (US)

(73) Assignee: DUKE UNIVERSITY, Durham, NC (US)

( * ) Notice: Subject to any disclaimer, the term of this patent is extended or adjusted under 35 U.S.C. 154(b) by 106 days.

(21) Appl. No.: 16/000,554

(22) Filed: Jun. 5, 2018

(65) Prior Publication Data

US 2019/0135842 A1 May 9, 2019

Related U.S. Application Data

(60) Provisional application No. 62/514,994, filed on Jun. 5, 2017.

(51) Int. Cl.
*C07F 15/00* (2006.01)
*B01J 31/18* (2006.01)
*B01J 35/00* (2006.01)

(52) U.S. Cl.
CPC ......... *C07F 15/0053* (2013.01); *B01J 31/183* (2013.01); *B01J 31/1815* (2013.01); *B01J 35/004* (2013.01); *B01J 2231/70* (2013.01); *B01J 2531/025* (2013.01); *B01J 2531/0216* (2013.01); *B01J 2531/0244* (2013.01); *B01J 2531/26* (2013.01); *B01J 2531/821* (2013.01); *B01J 2540/225* (2013.01)

(58) Field of Classification Search
CPC ... C07F 15/0053; C07F 15/00; B01J 31/1815; B01J 31/18; B01J 35/00
See application file for complete search history.

(56) References Cited

PUBLICATIONS

Armaroli, Photochem Photobiol Sci, 2003, vol. 2, 73-87. (Year: 2003).*
Nogueira, Inorg Chem, vol. 43, 396-398, 2004. (Year: 2004).*
Flamigni, J Phys Chem B, 1997, vol. 101, 5936-5943. (Year: 1997).*
Balzani, Coordinarion CHemistry Reviews, VOl 211, 2001, 97-115. (Year: 2001).*
Campbell, J Org Chem, vol. 67(4), 1133-1140, 2002. (Year: 2002).*
Duncan, JACS, vol. 129, 2007, 9691-9703. (Year: 2007).*
Ishizuka, JACS, vol. 133, 2011, 2884-2896. (Year: 2011).*
Sauvage et al., "Ruthenium(II) and Osmium(II) Bis(terpyridine) Complexes in Covalently-Linked Multicomponent Systems: Synthesis, Electrochemical Behavior, Absorption Spectra, and Photochemical and Photophysical Properties," Chemical Reviews, 1994, pp. 993-1019, vol. 94.
Kuciauskas et al., "Transient Absorption Spectroscopy of Ruthenium and Osmium Polypyridyl Complexes Adsorbed onto Nanocrystalline TiO2 Photoelectrodes," The Journal of Physical Chemistry, 2002, pp. 9347-9358, vol. 106.
Alstrum-Acevedo et al., "Chemical Approaches to Artificial Photosynthesis. 2," Inorganic Chemistry 2005, pp. 6802-6827, vol. 44.
Furue et al., "Trifluoromethyl-Substituted 2,2'-Bipyridine Ligands. Synthetic Control of Excited-State Properties of Ruthenium(II) Tris-Chelate Complexes," Inorganic Chemistry, 1992, pp. 3792-3795, vol. 31.
Goll et al., "Synthesis, Structure, Electronic Spectroscopy, Photophysics, Electrochemistry, and X-ray Photoelectron Spectroscopy of Highly-Electron-Deficient [5,10,15,20-Tetrakis(perfluoroalkyl)porphinato]zinc(II) Complexes and Their Free Base Derivatives" Journal of the American Chemical Society, 1996, pp. 8344-8354, vol. 118.
Wang et al., "Sensitizer-Catalyst Assemblies for Water Oxidation" Inorganic Chemistry, 2015, pp. 2742-2751, vol. 54.
Jiang et al., "High-Potential Porphyrins Supported on SnO2 and TiO2 Surfaces for Photoelectrochemical Applications," The Journal of Physical Chemistry, 2016, pp. 28971-28982, vol. 120.

* cited by examiner

*Primary Examiner* — D Margaret M Seaman
(74) *Attorney, Agent, or Firm* — Talem IP Law, LLP

(57) ABSTRACT

High-potential photo-oxidants are provided with a supermolecule structure at least including a conjugated macrocycle linked to a metal complex. The conjugated macrocycle is electron-accepting relative to hydrogen or bears electron withdrawing substituents such as fluoroalkyl, fluoroaryl, fluoro, halo, cyano, or nitro. The metal complex is also electron-accepting relative to hydrogen or bears electron withdrawing substituents such as fluoroalkyl, fluoroaryl, fluoro, halo, cyano, or nitro. The linker can be thynyl, vinyl, thiophenyl, diethynylaryl, divinylaryl, diethynyl(unsaturated heterocycloalkenyl), divinyl(unsaturated heterocycloalkenyl), diethynyl(unsaturated heterocycloalkynyl), or divynyl(unsaturated heterocycloalkynyl). A specific implementation is an ethyne-bridged eDef-Rutpy-(porphinato)Zn(II) (eDef-RuPZn) supermolecule.

20 Claims, 14 Drawing Sheets

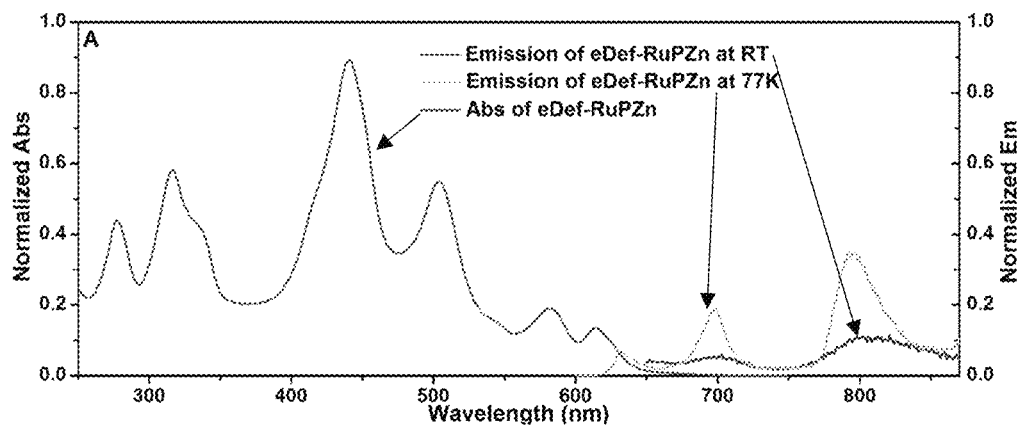
FIG. 12A
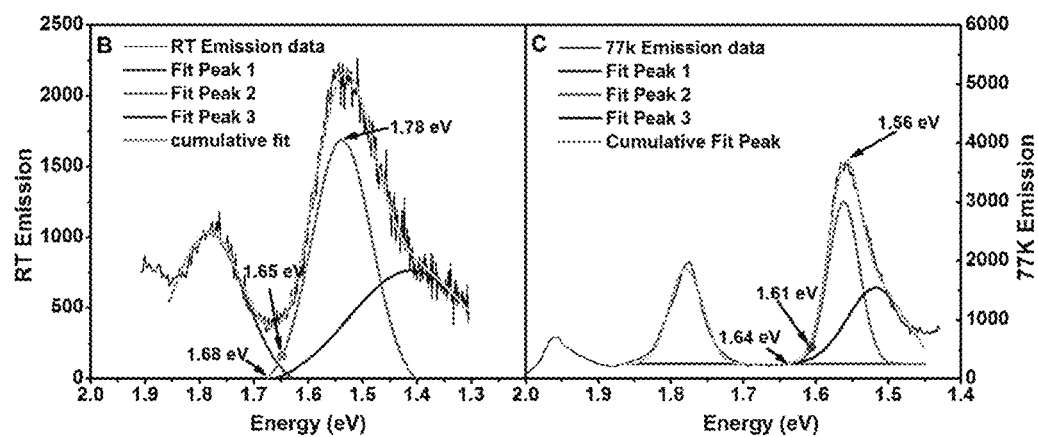
FIG. 12B  FIG. 12C

PHOTO-OXIDANTS FOR ENERGY CONVERSION AND CATALYSTS AND SYSTEMS AND METHODS OF USING SAME

CROSS-REFERENCE TO RELATED APPLICATION

This application claims the benefit of U.S. Provisional Application Ser. No. 62/514,994, filed Jun. 5, 2017.

GOVERNMENT SUPPORT

This invention was made with government support under Grant No. CHE-1413333 awarded by the National Science Foundation. The U.S. Government has certain rights in this invention.

BACKGROUND

Photochemistry and catalysis are two of the many areas of interest for energy generation and efficiencies in chemical reactions. Photochemistry involves chemical reactions caused by absorption of light in the visible range (as well as ultraviolet and infrared light). Catalysis involves accelerating (or in some cases slowing) the rate of chemical reaction. Applications currently being considered include light-driven water oxidation in dye-sensitized photoelectrosynthesis cells (DSPECs), photoredox catalysis of organic transformations, and photodecomposition of heavily halogenated hydrocarbon wastes.

DSPECs are used to produce solar fuels by splitting water into $H_2$ and $O_2$ or by solar-driven reduction of $CO_2$ by water to carbon-based fuels. Current DSPECs integrate molecular level light absorption and catalysis with the bandgap properties of stable oxide materials such as $TiO_2$ and NiO. Excitation of surface-bound chromophores of the current DSPECs leads to excited state formation and rapid electron or hole injection into the conduction or valence bands of n or p-type oxides.

Photoredox catalysis of organic transformations uses the energy of light to accelerate the chemical reaction of organic compounds via single-electron transfer. Photoredox catalysis can be used to enable challenging bond constructions not typically available under standard processes by exploiting the energy gained by the absorption of light (which is relatively low energy) by the catalyst.

Halogenated hydrocarbon wastes are a type of hazardous waste materials, which can benefit from being decomposed. Photodecomposition can provide an efficient and relatively safe manner of doing so.

These and other applications can benefit from high potential photo-oxidants that feature comprehensive absorptivity in the visible spectral domain and long-lived excited states.

BRIEF SUMMARY

Photo-oxidants for energy conversion and catalysts and systems and methods of using same are described. The described photo-oxidants include high-potential chromophores capable of power a range of light-driven oxidation reactions. Chromophores are provided that not only exhibit a high electrode potential (e.g., excited-state reduction potential), but also support a higher range (of wavelengths) of absorptivity. These chromophores and systems, as well as related compositions, can also be used to drive challenging photo-oxidation reactions for applications such as energy conversion and photocatalysis.

A composition is provided given by the structure: $nR_1$-$M_1$-L-$M_2$-$mR_2$ as shown in FIG. 1A.

In the above given structure, L=ethynyl, vinyl, thiophenyl, diethynylaryl, divinylaryl, diethynyl(unsaturated heterocycloalkenyl), divinyl(unsaturated heterocycloalkenyl), diethynyl(unsaturated heterocycloalkynyl), or divynyl(unsaturated heterocycloalkynyl). $M_1$ is conjugated with a macrocycle bearing an electron withdrawing substituent (or a macrocycle that is electron accepting relative to hydrogen); and $M_1$=Zn, Mg, Cr, Fe, Co, Ni, Cu, Zr, Nb, Mo, Ru, Rh, Pd, Cd, Ge, Sn, Hf, Ta, W, Re, Os, Ir, Pt, Au, or Pb. $M_2$ is complexed with electron withdrawing ligands (or is electron accepting relative to hydrogen); and $M_2$=Fe, Ru, Os, Re, Ir, Rh, or Pt. In addition, $R_1$, $R_2$=F, $C_xF_{2x+1}$, CN, $NO_2$,

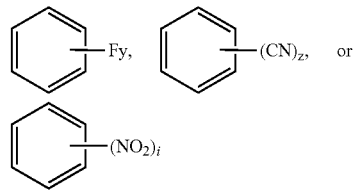

In some cases, a compound is provided with a formula of A-ethyne-B, where A is a conjugated macrocycle bearing fluoroalkyl, fluoroaryl, fluoro, or other electron withdrawing substituents such as halo, cyano, or nitro, or is electron-accepting relative to hydrogen; and B is a metal complex that also bears fluoroalkyl, fluoroaryl, fluoro, or other electron withdrawing substituents such as halo, cyano, or nitro, or is electron-accepting relative to hydrogen.

In some cases, a compound is provided with a formula of A-L-B, where linker L is ethynyl, vinyl, thiophenyl, diethynylaryl, divinylaryl, diethynyl(unsaturated heterocycloalkenyl), divinyl(unsaturated heterocycloalkenyl), diethynyl(unsaturated heterocycloalkynyl), or divynyl(unsaturated heterocycloalkynyl); A is a conjugated macrocycle bearing fluoroalkyl, fluoroaryl, fluoro, or other electron withdrawing substituents such as halo, cyano, or nitro, or is electron-accepting relative to hydrogen; and B is a metal complex that also bears fluoroalkyl, fluoroaryl, fluoro, or other electron withdrawing substituents such as halo, cyano, or nitro, or is electron-accepting relative to hydrogen.

In some cases, a compound is provided with a formula of A-ethyne-B-ethyne-A, where A is a conjugated macrocycle bearing fluoroalkyl, fluoroaryl, fluoro, or other electron withdrawing substituents such as halo, cyano, or nitro, or is electron-accepting relative to hydrogen; and B is a metal complex that also bears fluoroalkyl, fluoroaryl, fluoro, or other electron withdrawing substituents such as halo, cyano, or nitro, or is electron-accepting relative to hydrogen.

In some cases, a compound is provided with a formula of B-ethyne-A-ethyne-B, where A is a conjugated macrocycle bearing fluoroalkyl, fluoroaryl, fluoro, or other electron withdrawing substituents such as halo, cyano, or nitro, or is electron-accepting relative to hydrogen; and B is a metal complex that also bears fluoroalkyl, fluoroaryl, fluoro, or other electron withdrawing substituents such as halo, cyano, or nitro, or is electron-accepting relative to hydrogen.

In some cases, a compound is provided with a formula of A-L-B-L-A, where linker L is ethynyl, vinyl, thiophenyl, diethynylaryl, divinylaryl, diethynyl(unsaturated heterocycloalkenyl), divinyl(unsaturated heterocycloalkenyl), diethynyl(unsaturated heterocycloalkynyl), or divynyl(unsaturated heterocycloalkynyl); A is a conjugated macrocycle bearing fluoroalkyl, fluoroaryl, fluoro, or other electron withdrawing substituents such as halo, cyano, or nitro, or is electron-accepting relative to hydrogen; and B is a metal complex that also bears fluoroalkyl, fluoroaryl, fluoro, or other electron withdrawing substituents such as halo, cyano, or nitro, or is electron-accepting relative to hydrogen.

In some cases, a compound is provided with a formula of B-LA-L-B, where linker L is ethynyl, vinyl, thiophenyl, diethynylaryl, divinylaryl, diethynyl(unsaturated heterocycloalkenyl), divinyl(unsaturated heterocycloalkenyl), diethynyl(unsaturated heterocycloalkynyl), or divynyl(unsaturated heterocycloalkynyl); A is a conjugated macrocycle bearing fluoroalkyl, fluoroaryl, fluoro, or other electron withdrawing substituents such as halo, cyano, or nitro, or is electron-accepting relative to hydrogen; and B is a metal complex that also bears fluoroalkyl, fluoroaryl, fluoro, or other electron withdrawing substituents such as halo, cyano, or nitro, or is electron-accepting relative to hydrogen.

In an example implementation, an electron-deficient (eDef) high-potential chromophore capable of powering a broad range of light-driven oxidation reactions is provided as an ethyne-bridged eDef-Rutpy-(porphinato)Zn(II) (eDef-RuPZn) supermolecule. eDef-RuPZn is shown to be endowed with intense panchromatic absorptivity, a large magnitude excited-state reduction potential, and long-lived, highly oxidizing singlet and triplet charge-transfer (CT) excited states.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

Many aspects of the disclosure can be better understood with reference to the following drawings. While several implementations and examples are described in connection with these drawings, the disclosure is not limited to the implementations and examples disclosed herein.

FIG. 12A shows plots of a room-temperature (RT) emission spectrum (excitation wavelength=628 nm) of eDef-RuPZn in deaerated acetonitrile solvent, 77K emission spectrum (excitation wavelength=628 nm) of eDef-RuPZn in butyronitrile, along with the absorption spectrum of eDef-RuPZn in acetonitrile.

FIG. 12B shows Gaussian fitting of the RT emission data of FIG. 12A, with labeled energy (1.65 eV) at which the emission intensity is 10% that of the highest emission intensity.

FIG. 12C shows Gaussian fitting of the 77K emission data of FIG. 12A on energy scale, with labeled energy (1.61 eV) at which the emission intensity is 10% that of the highest emission intensity.

DETAILED DESCRIPTION

Figure 1A:
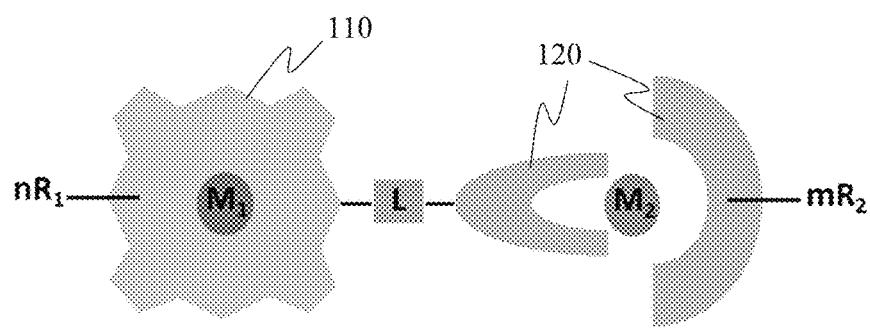
FIG. 1A shows an example general structure of a chromophore as described herein for energy conversion and photocatalysis applications.

Photo-oxidants for energy conversion and catalysts and systems and methods of using same are described. The described photo-oxidants include high-potential chromophores capable of power a range of light-driven oxidation reactions. Chromophores are provided that not only exhibit a high electrode potential (e.g., excited-state reduction potential), but also support a higher range (of wavelengths) of absorptivity. These chromophores and systems, as well as related compositions, can also be used to drive challenging photo-oxidation reactions for applications such as energy conversion and photocatalysis.

For the purposes of promoting an understanding of the principles of the present disclosure, reference will now be made to certain embodiments of the invention and specific language will be used to describe the same. It will nevertheless be understood that no limitation of the scope of the disclosure is thereby intended, such alteration and further modifications of the disclosure as illustrated herein, being contemplated as would normally occur to one skilled in the art to which the disclosure relates.

Articles "a" and "an" are used herein to refer to one or to more than one (i.e. at least one) of the grammatical object of the article. By way of example, "an element" means at least one element and can include more than one element.

Unless otherwise defined, all technical terms used herein have the same meaning as commonly understood by one of ordinary skill in the art to which this disclosure belongs.

Chromophores refer to molecules that can absorb certain wavelengths of light.

As described in more detail herein, high-potential chromophores capable of power a range of light-driven oxidation reactions are provided with compounds including a conjugated macrocycle and a metal complex.

Conjugation is the overlap of p-orbitals across a σ bond (sigma bond). In transition metals, d-orbitals may overlap. The orbitals have delocalized electrons when there are alternating single and multiple bonds in a molecule. Bonds alternate in a chain so long as each atom has an available p-orbital. Conjugation tends to lower the energy of the molecule and increase its stability. Conjugated systems can form chromophores.

Macrocycles have interior and exterior sites, which may be subject to site-specific substitution; and are often described as a molecule containing twelve or more atoms with at least one large ring.

A metal complex is also referred to as a coordination compound. Metal complexes or metal clusters can interact with or are stabilized by contact with the surface of inorganic carriers of oxides such as silica gel, alumina, and titanium dioxide, and by encapsulation in molecular sieves like zeolites, aluminum phosphates, or layer silicates like hectorite clays. A metal complex consists of a central metal atom or ion that is bonded to one or more ligands, which are ions or molecules that contain one or more pairs of electrons that can be shared with the metal. Metal complexes can be neutral; positively charged; or negatively charged. Electrically charged metal complexes are sometimes called complex ions. A coordination compound contains one or more metal complexes.

A composition is provided given by the structure:

FIG. 1A shows an example general structure of a chromophore as described herein for energy conversion and photocatalysis applications.

In the example general structure, L=ethynyl, vinyl, thiophenyl, diethynylaryl, divinylaryl, diethynyl(unsaturated heterocycloalkenyl), divinyl(unsaturated heterocycloalkenyl), diethynyl(unsaturated heterocycloalkynyl), or divynyl (unsaturated heterocycloalkynyl). $M_1$ is conjugated with a macrocycle bearing an electron withdrawing substituent (or a macrocycle that is electron accepting relative to hydrogen); and $M_1$=Zn, Mg, Cr, Fe, Co, Ni, Cu, Zr, Nb, Mo, Ru, Rh, Pd, Cd, Ge, Sn, Hf, Ta, W, Re, Os, Ir, Pt, Au, or Pb. $M_2$ is complexed with electron withdrawing ligands (or is electron accepting relative to hydrogen); and $M_2$=Fe, Ru, Os, Re, Ir, Rh, or Pt. In addition, $R_1$, $R_2$=F, $C_xF_{2x+1}$, CN, $NO_2$,

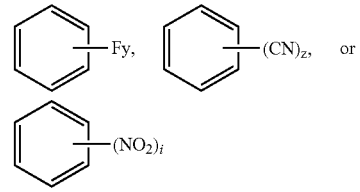

Figure 1B:
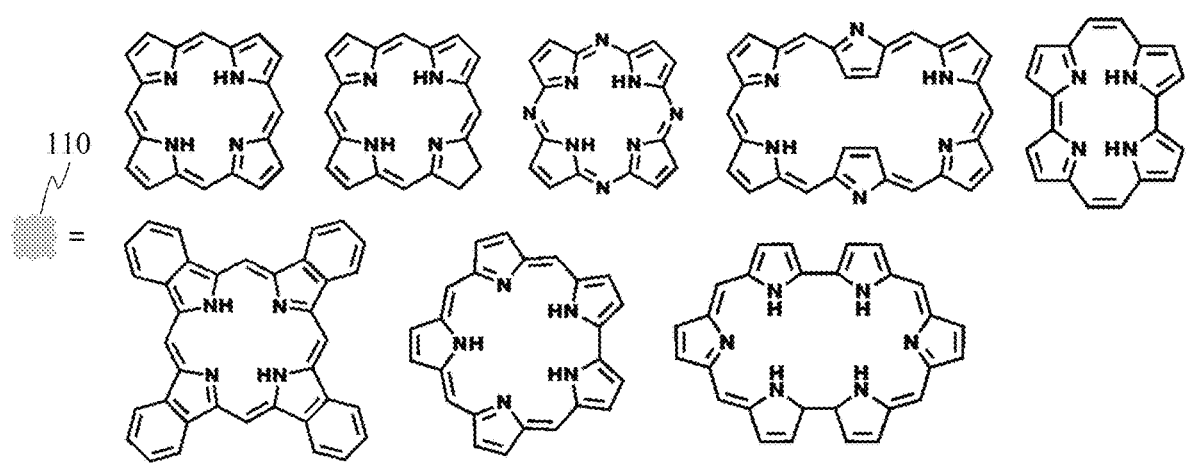
FIG. 1B shows example structural formulas for a macrocycle in the example general structure of FIG. 1A.
Figure 1C:
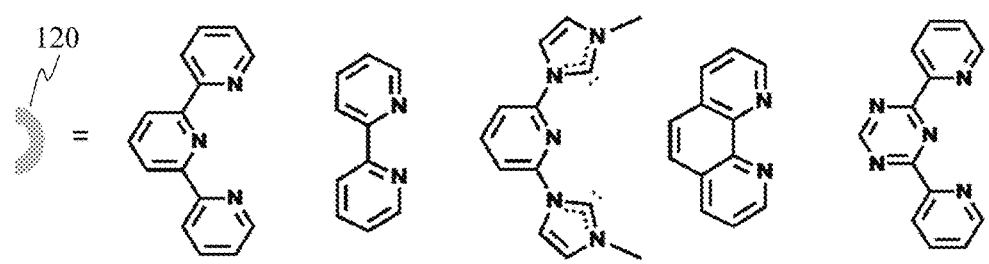
FIG. 1C shows example structural formulas for a surrounding array of bound complexing agents, or ligands, in the example general structure of FIG. 1A.

FIG. 1B shows example structural formulas for a macrocycle 110 in the example general structure of FIG. 1A; and FIG. 1C shows example structural formulas for a surrounding array 120 of bound complexing agents, or ligands, for $M_2$ in the example general structure of FIG. 1A.

In some cases, the composition can be given by the structure:

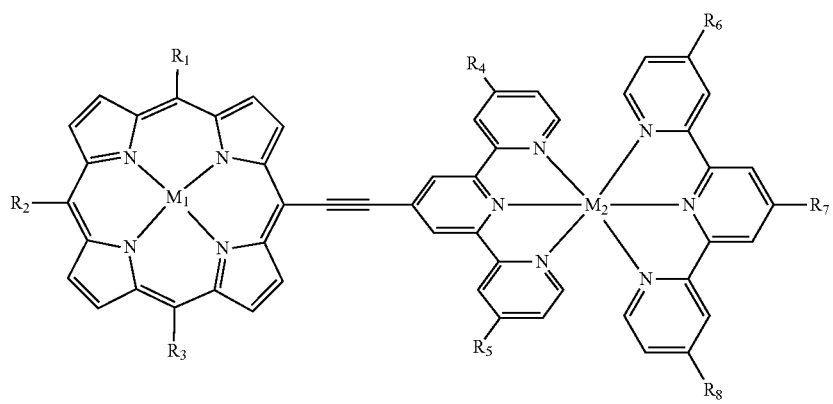

where $M_1$=Zn, Mg, Cr, Fe, Co, Ni, Cu, Zr, Nb, Mo, Ru, Rh, Pd, Cd, Ge, Sn, Hf, Ta, W, Re, Os, Ir, Pt, Au, or Pb; $M_2$=Fe, Ru, Os, Re, Ir, Rh, or Pt; and $R_{1-8}$=F, $C_xF_{2x+1}$, CN, $NO_2$,

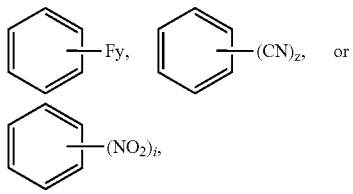

where x, y, z and i are integers.

In some cases, the composition can be given by the structure:

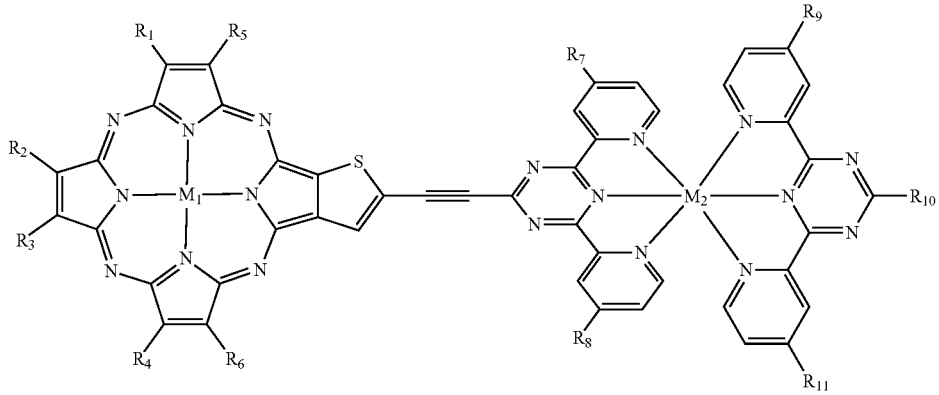

where $M_1$=Zn, Mg, Cr, Fe, Co, Ni, Cu, Zr, Nb, Mo, Ru, Rh, Pd, Cd, Ge, Sn, Hf, Ta, W, Re, Os, Ir, Pt, Au, or Pb; $M_2$=Fe, Ru, Os, Re, Ir, Rh, or Pt; and F, $C_xF_{2x+1}$, CN, $NO_2$,

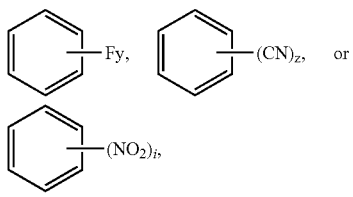

where x, y, z and i are integers.

It should be noted that the above structures are just two example structures according to the general structure composition of FIGS. 1A-1C.

In various implementations, a compound having a formula of (1) A-ethyne-B, (2) A-ethyne-B-ethyne-A, (3) B-ethyne-A-ethyne-B, (4) A-L-B, (5) A-L-B-L-A, or (6) B-L-A-L-B can be used, where A is a conjugated macrocycle bearing an electron withdrawing substituent or is electron-accepting relative to hydrogen; and B is a metal complex bearing an electron withdrawing substituent or is electron-accepting relative to hydrogen.

An electron withdrawing group refers to an atom or group that draws electron density from neighboring atoms, such as from a reaction center, towards itself, usually by resonance or inductive effects. Resonance refers to a system in oscillation due to some external force. Inductive effects refer to the effect on electron density in one portion of a molecule due to electron-withdrawing or electron-donating groups elsewhere in the molecule. Further, electron withdrawing groups can be identified through routine experimentation by, for example, substitution in a molecule and testing of any resultant inductive effects.

The electron withdrawing substituent for A can be selected from the group or a subset of the group consisting of fluoroalkyl, fluoroaryl, fluoro, halo, cyano, and nitro. Similarly, the electron withdrawing substituent for B can be selected from the group or a subset of the group consisting of fluoroalkyl, fluoroaryl, fluoro, halo, cyano, and nitro. In some cases, the electron withdrawing substituent for A, B, or both is perfluoroalkyl or perfluoroaryl.

In some cases, the macrocycle is a porphyrin, porphycene, rubyrin, rosarin, hexaphyrin, sapphyrin, chlorophyl, chlorin, phthalocyanine, porphyrazine, bacteriochlorophyl, pheophytin, texaphyrin, or related macrocyclic-based component, that is capable of binding a metal ion.

A porphyrin refers to a derivative of porphine, a conjugated cyclic structure of four pyrrole rings (a five-membered ring containing a nitrogen atom) linked through their 2- and 5-positions by methine bridges. A porphyrin has four of its nitrogen atoms facing the center, which can capture a metal ion to form a very stable organometallic complex Porphyrins can bear up to 12 substituents at meso (i.e., o) and pyrrolic (i.e., B) positions thereof. (See, e.g. U.S. Pat. No. 5,371,199, which is incorporated by reference).

In some cases, the conjugated macrocycle is a porphyrin complexed to metal atom $M_1$. The metal atom $M_1$ can be selected from the group or a subset of the group consisting of Zn, Mg, Cr, Fe, Co, Ni, Cu, Zr, Nb, Mo, Ru, Rh, Pd, Cd, Ge, Sn, Hf, Ta, W, Re, Os, Ir, Pt, Au, or Pb. For example, $M_1$ can be selected from the group consisting of Zn, Co, Ni, Fe, Pt, and Pd.

In some cases, the metal complex is a (polypyridyl)metal species. In some cases, the polypyridyl ligand of the (polypyridyl)metal species is terpyridyl or bipyridyl. In some cases, the metal complex is a (poly-heterocyclic)metal species. In some cases, the metal complex includes a transition metal (a metal in Groups 1B-8B). In some cases, the metal complex includes a Group 8 transition metal (Fe, Ru, Os, or Hs). In some cases, the metal complex includes a transition metal selected from the group consisting of Fe, Ru, Os, Rh, Ir, and Pt. The metal complex may be neutral or charged (e.g., positively charged or negatively charged).

For formulas with linker L (e.g., 4, 5, and 6), linker L can be ethynyl, vinyl, thiophenyl, diethynylaryl, divinylaryl, diethynyl(unsaturated heterocycloalkenyl), divinyl(unsaturated heterocycloalkenyl), diethynyl(unsaturated heterocycloalkynyl), or divynyl(unsaturated heterocycloalkynyl).

The described compounds may be characterized according to their singlet excited-state reduction potential, triplet excited-state reduction potential, singlet excited-state lifetime, triplet excited-state lifetime, and/or total integrated absorptive oscillator strengths. In some cases, a compound according to any of the described formulas has a singlet excited-state reduction potential ($^1E^{-/*}$) of at least 1.50 V. In some cases, a compound according to any of the described formulas has a triplet excited-state reduction potential ($^3E^{-/*}$) of at least 1.20 V. In some cases, a compound according to any of the described formulas has a singlet excited-state lifetime of at least 10 ps. In some cases, a compound according to any of the described formulas has a triplet excited-state lifetime of at least 1 µs. In some cases, a compound according to any of the described formulas has a total integrated absorptive oscillator strengths calculated over the 26,300 cm$^{-1}$ (380 nm) to 14,280 cm$^{-1}$ (700 nm) spectral range at least five times larger than that determined for the benchmark compound Ru(tpy)$^{2+}$.

In an example implementation of the described compounds, an electron-deficient (eDef) high-potential chromophore capable of powering a broad range of light-driven oxidation reactions is provided as an ethyne-bridged eDef-Rutpy-(porphinato)Zn(II) (eDef-RuPZn) supermolecule (A=eDef-Rutpy-(porphinato)Zn(II); B=eDef-RuPZn; L=ethyne). eDef-RuPZn is shown to be endowed with intense panchromatic absorptivity, a large magnitude excited-state reduction potential, and long-lived, highly oxidizing singlet and triplet charge-transfer (CT) excited states.

(Polypyridyl)metal complexes like Ru(tpy)$_2$2+ and Ru(bpy)$_3$2+ have been a focus of attention for light-driven oxidation reactions for energy conversion and photocatalysis applications. However, corresponding electron-deficient (eDef) high-potential chromophores capable of powering a broader range of light-driven oxidation reactions have shown little progress. Typically, eDef chromophores suffer from a combination of short excited state lifetimes, limited vis-spectral domain absorptivity, or photochemical instability.

Given challenges commonly associated with cross-coupling reactions involving 2-pyridyl derivatives, syntheses of eDef-Tpy and eDef-TpyBr precursor ligands defined key obstacles to the target eDef-Rutpy and eDef-RuPZn chromophores. eDef-RuPZn was constructed via Sonogashira cross-coupling of [5-ethynyl-10, 15, 20-tris(perfluoropropyl)porphinato]Zn(II) and eDef-RutpyBr fragments. The syntheses of eDef-Rutpy and eDef-RuPZn chromophores are described in detail with respect FIG. 5.

Figure 2A:
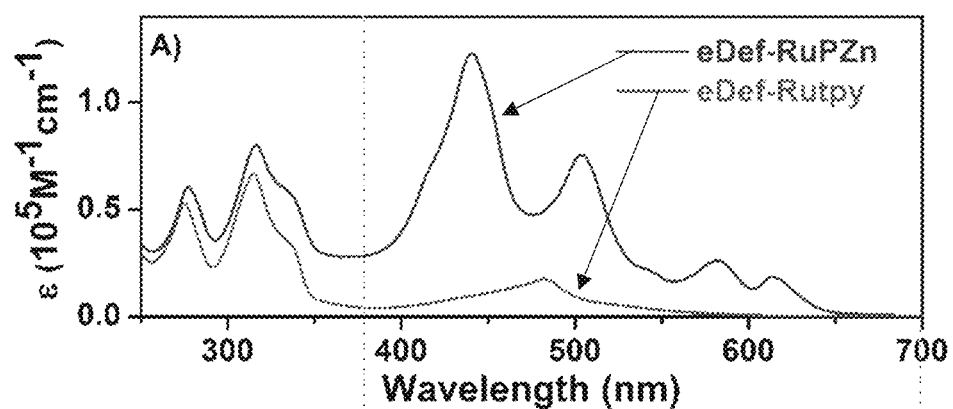
FIG. 2A shows electronic absorption spectra of eDef-Rutpy and eDef-RuPZn in acetonitrile solvent.
Figure 2B:
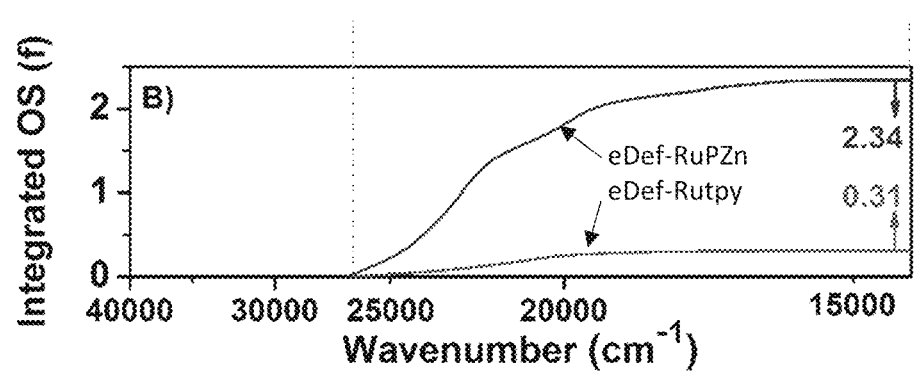
FIG. 2B shows a plot of total integrated absorptive oscillator strengths for eDef-Rutpy and eDef-RuPZn.

FIG. 2A shows electronic absorption spectra of eDef-Rutpy and eDef-RuPZn in acetonitrile solvent; and FIG. 2B shows a plot of total integrated absorptive oscillator strengths for eDef-Rutpy and eDef-RuPZn. In FIG. 2B, the plot of total integrated absorptive oscillator strengths were calculated over the 26316 cm$^1$ (380 nm) to 14286 cm$^1$ (700 nm) spectral range (see Turro, N. J. *Principles of Modern Molecular Photochemistry*; University Science Books: Sausalito, Calif., 2009).

The electronic absorption spectrum (EAS) of eDef-Rutpy in acetonitrile solvent bears a close resemblance to that of Ru(tpy)$_2$$^{2+}$ (FIG. 2B). eDef-Rutpy evinces ligand-localized π-π* transitions over the 260-350 nm range ($\lambda_{max}$=275 nm, ε=53100 M$^{-1}$ cm$^{-1}$; $\lambda_{max}$=315 nm, ε=66500 M$^{-1}$ cm$^{-1}$), and a weaker MLCT manifold spanning the 400-600 nm spectral window ($\lambda_{max}$=482 nm; ε=17600 M$^{-1}$ cm$^{-1}$), akin to those characteristic of Ru(tpy)$_2$$^{2+}$ [π-π* ($\lambda_{max}$=271 nm, ε=46800 M$^{-1}$ cm$^{-1}$; $\lambda_{max}$=307 nm, ε=68700 M$^{-1}$ cm$^{-1}$); MLCT ($\lambda_{max}$=476 nm, ε=17700 M$^{-1}$ cm$^{-1}$)]. The similarities between the steady-state EAS of eDef-Rutpy and Ru(tpy)$_2$$^{2+}$ suggest that the six CF$_3$ groups of the former implement the electron-withdrawing effect through the ligand a-bond network, without substantially perturbing the character of the n-electron system. In effect, the nature of the electronic transitions of eDef-Rutpy is unperturbed relative to Ru(tpy)$_2$, while eDef-Rutpy becomes uniformly more oxidizing (see below). However, the lack of significant oscillator strength in the visible remains a limitation of both Ru(tpy)$_2$ and eDef-Rutpy for light-driven reactions.

As can be seen in FIG. 2B, directly addressing the issue of visible absorptivity, the EAS of eDef-RuPZn features almost eight times the oscillator strength as that of eDef-Rutpy in the 380-700 nm visible spectrum range, and displays spectral features similar to those evinced by RuPZn. The porphyrin B-state derived transition centered at 441 nm manifests an absorption maximum that exceeds 1.2×10$^5$ M$^{-1}$ cm$^{-1}$. The transition centered at 504 nm (ε=75400 M$^{-1}$ cm$^{-1}$) derives from the Ru(II) complex MLCT band and oscillator-strength mixing involving the porphyrin moiety. Note that the weakest eDef-RuPZn absorption bands at 582 nm (ε=26100 M$^{-1}$ cm$^{-1}$) and 614 nm (ε=18600 M$^{-1}$ cm$^{-1}$) are more intense than the Ru(tpy)$_2$$^{2+}$ MLCT band. These two low-energy bands derive from mixing of porphyrin Q-state transitions with the Ru(tpy)$_2$$^{2+}$ MLCT transition, enabled by head-to-tail transition dipole alignment of the (porphinato)metal and (terpyridyl)metal chromophoric components.

Figure 3A:
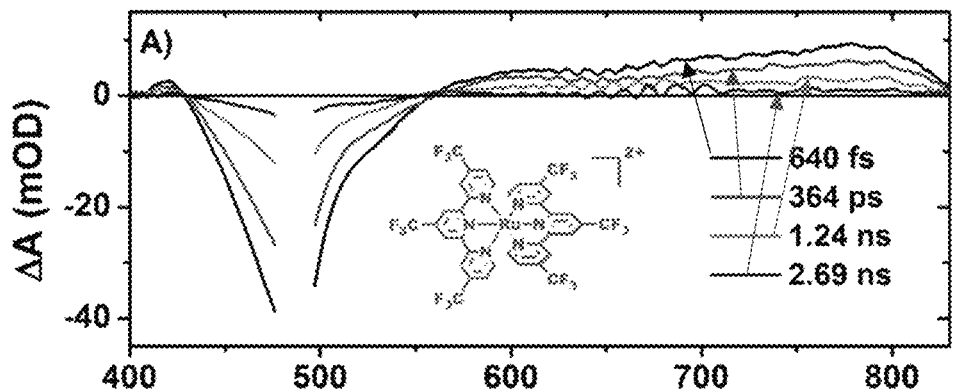
FIG. 3A shows a representative ultra-fast transient absorption spectra recorded at several time delays for eDef-Rutpy.
Figure 3B:
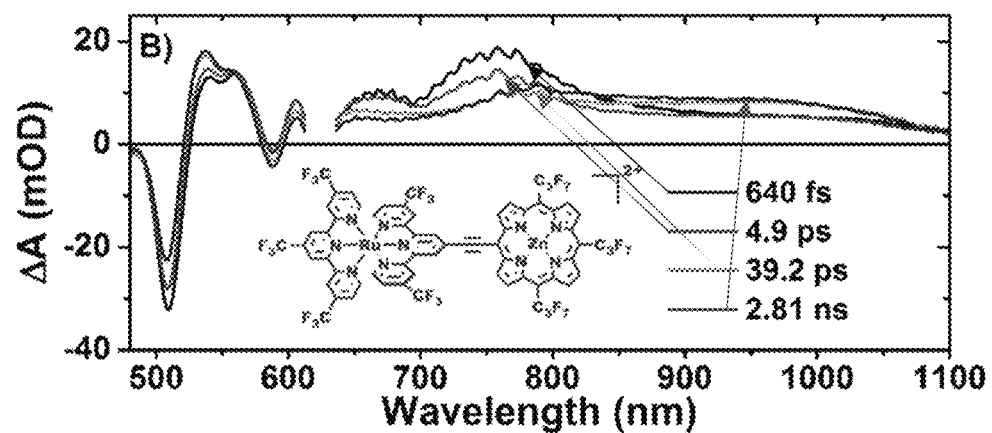
FIG. 3B shows representative ultra-fast transient absorption spectra recorded at several time delays for eDef-RuPZn.

FIG. 3A shows a representative ultra-fast transient absorption spectra recorded at several time delays for eDef-Rutpy; and FIG. 3B shows representative ultra-fast transient absorption spectra recorded at several time delays for eDef-RuPZn. Experimental conditions included: solvent=acetonitrile; temperature=21° C.; magic angle polarization; eDef-Rutpy: $\lambda_{ex}$=480 nm, P$_{ex}$=1 µJ/Pulse; eDef-RuPZn: $\lambda_{ex}$=620 nm, P$_{ex}$=870 nJ/pulse.

As reflected in FIGS. 3A and 3B, ultrafast transient absorption experiments demonstrate excited-state dynamics for eDef-Rutpy and eDef-RuPZn in acetonitrile solvent similar to those of their electron-rich counterparts (see Duncan, T. V.; Rubtsov, I. V.; Uyeda, H. T.; Therien, M. J. *J. Am. Chem. Soc.* 2004, 126, 9474; Duncan, T. V.; Ishizuka, T.; Therien, M. J. *J. Am. Chem. Soc.* 2007, 129, 9691; Singh-Rachford, T. N.; Nayak, A.; Muro-Small, M. L.; Goeb, S.; Therien, M. J.; Castellano, F. N. *J. Am. Chem. Soc.* 2010, 132, 14203; and Nayak, A.; Park, J.; De Mey, K.; Hu, X.; Duncan, T. V.; Beratan, D. N.; Clays, K.; Therien, M. J. *ACS Cent. Sci.* 2016, 2, 954).

Excitation of eDef-Rutpy at 480 nm, as shown in FIG. 3A, generates the broad featureless transient absorption characteristic of the $^3$MLCT state within the 200 fs time resolution of the instrument. As shown in FIG. 12A, the 1 ns $^3$MLCT state lifetime of eDef-Rutpy is 4 times longer than the 250 ps lifetime of Ru(tpy)$_2$$^{2+}$, likely due to $^3$MC state destabilization relative to the $^3$MLCT state, resulting from —CF$_3$ substitution.

Excitation of eDef-RuPZn at 620 nm, as shown in FIG. 3B, generates an intense NIR transient absorption manifold that becomes more intense upon S$_1$→T$_1$ intersystem crossing (ISC) to the long-lived T$_1$ charge-transfer state. For eDef-RuPZn, the 13.5 ps S$_1$→T$_1$ ISC time constant and the 93 µs T$_1$ excited-state lifetime (see FIGS. 13-16) are extended by at least two orders of magnitude relative to the sub-100 fs ISC time constants and ns-timescale T$_1$ lifetimes characteristic of Ru(tpy)$_2^{2+}$ and its derivatives (see Maestri, M.; Armaroli, N.; Balzani, V.; Constable, E. C.; Thompson, A. M. W. C. Inorg. Chem. 1995, 34, 2759; and Pal, A. K.; Hanan, G. S. Chem. Soc. Rev. 2014, 43, 6184).

Long excited-state lifetimes of photo-oxidants are crucial for achieving high yields of desired photoreactions. For instance, sub-ps timescale electron injection from the short-lived $^1$MLCT states of Ru(II) polypyridyl complexes into TiO$_2$ semiconductor interfaces cannot typically proceed with unit quantum yield; hence, a substantial degree of electron injection occurs from the energetically lower $^3$MLCT states over the 10-100 ps time domain. Given the magnitudes of the respective eDef-RuPZn S$_1$- (13.5 ps) and T$_1$-state (93 ps) lifetimes, it is clear that this chromophore design offers not only new opportunities to achieve high-yield charge injection at semiconductor interfaces, but the possibility to engineer energy conversion systems that realize substantial electron transfer quenching of the $^1$eDef-RuPZn* state, before energy-wasting $^1$MLCT→$^3$MLCT ISC can occur.

Figure 4:
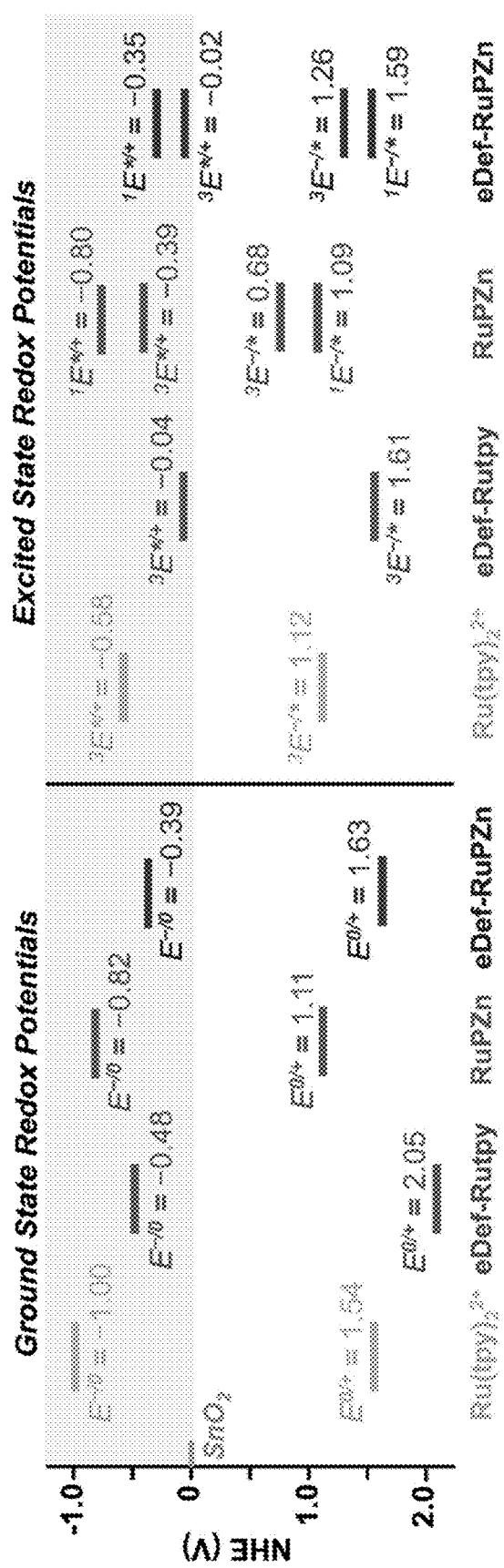
FIG. 4 illustrates redox potentials from potentiometric data of Ru(tpy)$_2^{2+}$, eDef-Rutpy, RuPZn and eDef-RuPZn.

FIG. 4 illustrates redox potentials from potentiometric data of Ru(tpy)$_2^{2+}$, eDef-Rutpy, RuPZn and eDef-RuPZn. The Left Panel shows ground-state Ru(tpy)$_2^{2+}$, eDef-Rutpy, RuPZn and eDef-RuPZn potentiometric data; and the Right Panel shows corresponding S$_1$- and T$_1$-state redox properties for these chromophores (The calculations of the redox properties are described in detail in the section entitled "*Calculation of Excited State Redox Potential*" herein).

Figure 13:
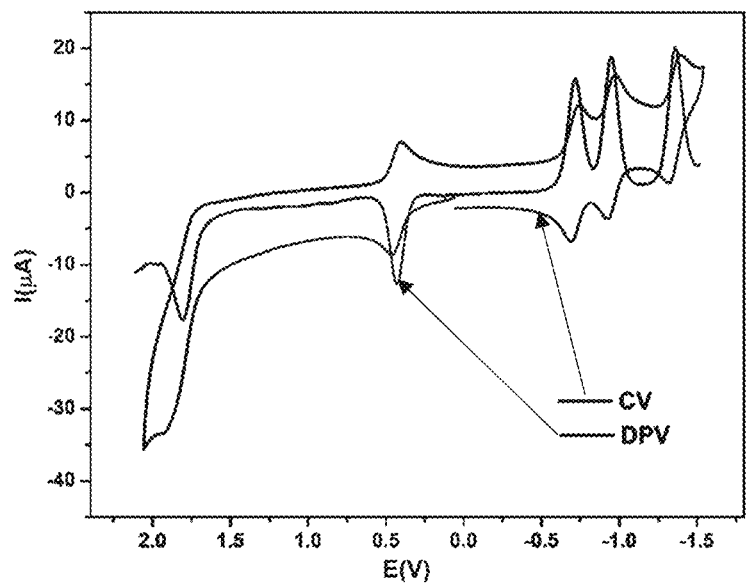
FIG. 13 shows potentiometric data of eDef-Rutpy (vs. SCE) in 0.1 M TBAPF$_6$/acetonitrile electrolyte/solvent system.
Figure 14:
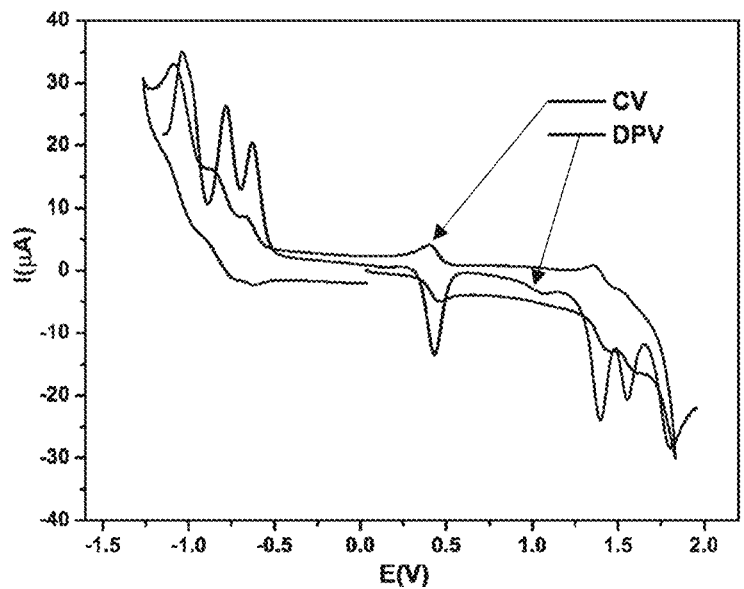
FIG. 14 shows potentiometric data of eDef-RuPZn (vs. SCE) in 0.1 M TBAPF$_6$/acetonitrile electrolyte/solvent system.

FIGS. 13 and 14 show potentiometric data of eDef-Rutpy and eDef-RuPZn, respectively. Potentiometric data acquired for eDef-Rutpy and eDef-RuPZn reveal that perfluoroalkyl substitution raises the E$^{0/+}$ values of these chromophore motifs by ~0.5 V relative to their respective chromophoric benchmarks.

Note that the measured E$_{1/2}$(Ru$^{2I/3I}$) value for eDef-Rutpy (2.05 V) is ~300 mV higher than the Ru$^{2+/3+}$ potentials realized for electron-poor Ru(tpy)$_2^{2+}$ derivatives that feature extensive —CN/—NO$_2$ substitution (see Fallahpour, R. A.; Neuburger, M.; Zehnder, M. New J. Chem. 1999, 23, 53; Wang, J. H.; Fang, Y. Q.; Hanan, G. S.; Loiseau, F.; Campagna, S. Inorg. Chem. 2005, 44, 5), and ~200 mV higher than that reported for Ru(dqxp)$_2^{2+}$, a chromophore having the highest E$_{1/2}$(Ru$^{2+/3+}$) potential yet established for tridentate Ru(II) complexes (see Pal, A. K.; Hanan, G. S. Chem. Soc. Rev. 2014, 43, 6184).

Similarly, the E$_{1/2}$(eDef-RuPZn)$^{0/+}$ potential (1.63 V) is more than 0.5 V larger than that determined for RuPZn (see also Uyeda, H. T.; Zhao, Y. X.; Wostyn, K.; Asselberghs, I.; Clays, K.; Persoons, A.; Therien, M. J. J. Am. Chem. Soc. 2002, 124, 13806; and Duncan, T. V.; Ishizuka, T.; Therien, M. J. J. Am. Chem. Soc. 2007, 129, 9691). Note that the eDef-RuPZn E$^{0/+}$ value is remarkably high for a large π-conjugated system. While π-conjugation expansion is a common approach by which panchromatic absorptivity may be realized, it can come at the expense of a destabilized HOMO level that diminishes E$_{1/2}^{0/+}$: here broad high-oscillator strength vis domain spectral absorptivity derives from the multi-directional CT nature of low-lying eDef-RuPZn excited states, preserving a substantial E$_{1/2}^{0/+}$.

Excited-state redox potentials (E$^{-/*}$ and E$^{*/+}$) of eDef-Rutpy and eDef-RuPZn determine thermodynamic driving forces (ΔG) for photo-reduction and photo-oxidation reactions. The S$_1$-state reduction potential ($^1$E$^{-/*}$=1.59 V) of eDef-RuPZn is impressive, even slightly higher than that of Ru(CN-tpy)$_2^{2+}$, which has the highest excited-state reduction potential among established tridentate Ru(II) complexes (see Wang, J. H.; Fang, Y. Q.; Hanan, G. S.; Loiseau, F.; Campagna, S. Inorg. Chem. 2005, 44, 5), but much poorer absorptivity than eDef-RuPZn and an excited state lifetime two orders of magnitude shorter then eDef-RuPZn.

In the context of DSPEC architectures, comparison of the chromophore E$^{*/+}$ values with the conduction band onsets of semiconductor electrodes evaluates the feasibility of photoinduced electron injection to generate (chromophore)$^|$ species that may perform desired oxidative chemistry. The S$_1$ state E$^{*/+}$ value of eDef-RuPZn is −0.35 V, indicating an exergonic ΔG for electron injection into SnO$_2$, a popular semiconductor electrode material with a low conduction band onset of 0 V (vs. NHE) at neutral pH (see Knauf, R. R.; Brennaman, M. K.; Alibabaei, L.; Norris, M. R.; Dempsey, J. L. J. Phys. Chem. C 2013, 117, 25259). The 13.5 ps S$_1$-state lifetime of eDef-RuPZn, two orders of magnitude longer than those of conventional Ru(II) terpyridyl derivatives, suggests opportunities to realize high quantum yield S$_1$ state electron injection; it is also important to underscore that in circumstances where eDef-RuPZn ISC dynamics prevail over electron injection from the S$_1$ state, electron injection remains thermodynamically viable from the long-lived (93 μs) T$_1$ state. The potential of the (eDef-RuPZn)$^{·+}$ hole (1.63 V vs. NHE) is comparable with the reduction potential of the strong chemical oxidant Ce(NH$_4$)$_2$(NO$_3$)$_6$ see Blakemore, J. D.; Schley, N. D.; Balcells, D.; Hull, J. F.; Olack, G. W.; Incarvito, C. D.; Eisenstein, O.; Brudvig, G. W.; Crabtree, R. H. J. Am. Chem. Soc. 2010, 132, 16017), suggesting the breadth of chemistry that could be driven by DSPECs incorporating this high-potential panchromatic chromophore.

In contrast to the described photo-oxidents, established photo-oxidants such as porphyrin derivatives, perylene diimides, and metal complexes exhibit limited visible spectral coverage. Enhancement of long-wavelength oscillator strength by extending π-conjugation typically comes at the expense of a lower E$^{0/+}$ value (HOMO destabilization), thus diminishing the ΔG for oxidative chemistry. However, the compounds described herein can express a high potential (E$^{0/+}$ value) while providing a long-wavelength oscillator strength. Indeed, the specific example of a high-potential (terpyridyl)metal-based chromophore having panchromatic UV-vis spectral domain absorptivity, with an integrated visible oscillator strength eight fold greater than those of typical Ru(II) terpyridyl complexes shows promise for photo-oxidation. eDef-RuPZn is a panchromatic chromophore with a E$_{1/2}^{0/+}$ potential comparable to that of Ce(NH$_4$)$_2$(NO$_3$)$_6$, [E$_{1/2}$(Ce$^{3+/4+}$)=1.61 V vs. NHE], which affords eDef-RuPZn with an uncommonly large excited-state reduction potential ($^1$E$^{-/*}$=1.59 V; $^3$E$^{-/*}$=1.26 V).

As can be seen, eDef-Rutpy, a chromophore having the highest E$^{0/+}$ value of any known Ru(II) bis(tridentate) complex, along with a corresponding ethyne-bridged eDef-Rutpy(porphinato)Zn(II) (eDef-RuPZn) supermolecule is endowed with intense panchromatic absorptivity, a large magnitude excited-state reduction potential (e.g., ($^1$E$^{-/*}$=1.59 V; $^3$E$^{-/*}$=1.26 V), and long-lived (e.g., S$_1$- (13.5 ps) and T$_1$-state (93 μs) lifetimes), highly oxidizing singlet and triplet charge-transfer (CT) excited states.

A greater understanding of the present invention and of its many advantages may be had from the following example, given by way of illustration. The following examples are illustrative of some of the systems, methods, applications, embodiments and variants of the present invention. They are, of course, not to be considered in any way limitative of the invention. Numerous changes and modifications can be made with respect to the invention.

In general, an amount, size, formulation, parameter or other quantity or characteristic is "about" or "approximate", reflecting tolerances, conversion factors, rounding off, measurement error and the like, and other factors known to those of skill in the art, whether or not expressly stated to be "about" or "approximate".

Unless stated otherwise, all percentages, parts, ratios, etc., are by weight.

Further, when an amount, concentration, or other value or parameter is given as either a range, preferred range or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range. When a component is indicated as present in a range starting from 0, such component is an optional component (i.e., it may or may not be present). When present, an optional component may be present at a level of at least 0.1 weight % of the composition, unless present at specified lower amounts.

Chemical Synthesis of eDef-Rutpy and eDef-RuPZn

Figure 5:
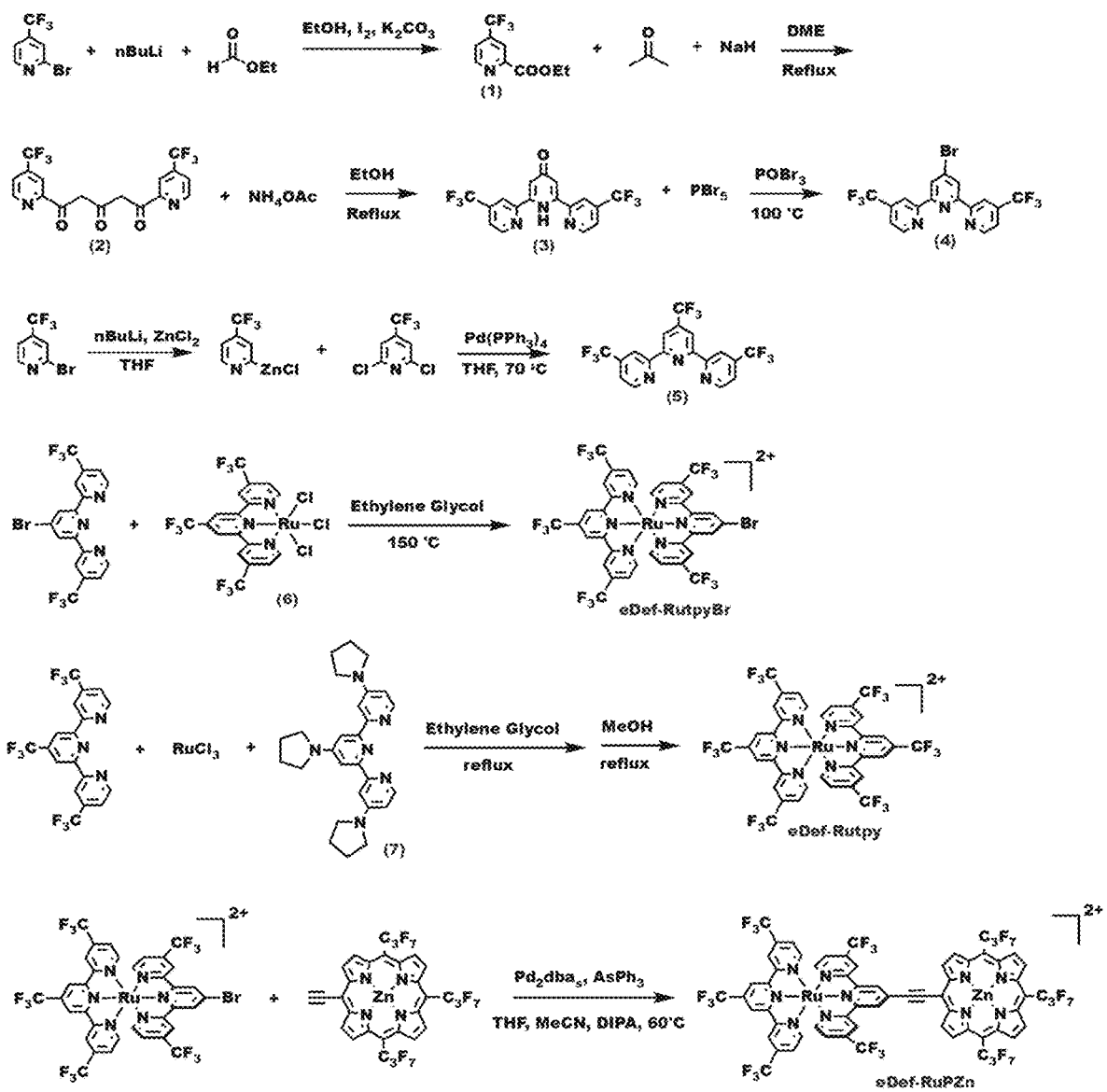
FIG. 5 illustrates a synthetic route to eDef-Rutpy and eDef-RuPZn according to an example method.

FIG. 5 illustrates a synthetic route to eDef-Rutpy and eDef-RuPZn according to an example method. All charged compounds feature $PF_6$-counter-anions.

Referring to FIG. 5, intermediates (1), (2), (3), (4), (5), (6), and (7) are used to synthesize eDef-Rutpy and eDef-RuPZn. Trials of using only (5) and $RuCl_3$ hydrate as starting materials for synthesizing eDef-Rutpy did not succeed. Instead, eDef-Rutpy was obtained from the reaction in which (5), (7) and $RuCl_3$ hydrate were used (heteroleptic coordination product was also obtained), as shown in FIG. 5.

Ethyl-4-trifluoromethylpicolinate (1). N-BuLi (3.6 ml, 9 mmol) was added dropwise to a solution of 2-bromo-4-trifluoromethylpyridine (1.0 ml, 8.1 mmol) in THF (50 ml) at −100° C. After 30 min at the same temperature, ethyl formate (6.5 ml, 81 mmol) was added to the mixture and the solution was stirred at −78° C. for another 3 h. EtOH (12 ml), $K_2CO_3$ (3.3 g, 24 mmol) and $I_2$ (6 g, 24 mmol) were then added; the reaction mixture was allowed to warm up and react for 15 h at RT (room temperature). After the reaction was complete, saturated $Na_2SO_3$ aqueous solution was added to quench excess $I_2$, and the crude product was extracted with DCM. The organic layer was dried with $Na_2SO_4$ salt and solvent was removed. The remaining crude product was purified by neutral alumina column chromatography (DCM:hexanes=3:1) to give a colorless oil (230 mg, 31%).

$^1$H NMR (400 MHz, $CDCl_3$, ppm): δ 8.95 (d, 1H, J=4 Hz), 8.35 (s, 1H), 7.70 (d, 1H, J=4 Hz), 4.51 (q, 2H, J=8 Hz), 1.46 (t, 3H, J=8 Hz).

$C_9H_8F_3NO_2$: m/z=219.05, MS: m/z=220.12 $[M+H]^+$.

1,5-Bis(4-(trifluoromethyl)pyridin-2-yl)pentane-1,3,5-trione (2). NaH (60% dispersion in mineral oil, 668 mg, 16.7 mmol) was suspended in dry DME (10 ml). A solution of acetone (0.245 ml, 3.33 mmol) and (1) (2.18 g, 10 mmol) in DME (20 ml) were added. The reaction was then stirred at 90° C. for 6 h and a brownish suspension was obtained. After careful removal of the solvent, $H_2O$ was added slowly and the mixture was neutralized with HCl. A dark yellow solid was obtained by filtration and was directly used in the next step (1.3 g, 33%).

4,4″-Bis(trifluoromethyl)-[2,2′,6′,2″-terpyridin]-4′(1′H)-one (3). A solution of (2) (890 mg, 3 mmol) and $NH_4OAc$ (4 g, excess) in EtOH (50 ml) was refluxed for 6 h. After removing the solvent, DCM and $H_2O$ were added to extract the crude product. The organic layer was washed with saturated $NaHCO_3$ (aq) solution. The crude product was purified by $SiO_2$ column chromatography (DCM:methanol=92:8) to give a yellow solid (200 mg, 72%) that used for the next step without further purification.

4′Bromo-4,4″-bis(trifluoromethyl)-2,2′,6′,2″-terpyridine (4). The brominated electron-deficient ligand (4) was synthesized by modifying an established synthetic procedure of terpyridine, such as described by Ushijima, S.; Moriyama, K.; Togo, H. Tetrahedron 2012, 68, 4701 and Constable, E. C.; Ward, M. D. J. Chem. Soc., Dalton Trans. 1990, 1405. In particular, a mixture of (3) (200 mg, 0.52 mmol), $PBr_5$ (336 mg, 0.78 mmol) and $POBr_3$ (1.6 g, excess) was heated at 100° C. for 16 h, following which, $H_2O$ and saturated $NaHCO_3$ (aq) solution were slowly added to neutralize the reaction. The crude product was then extracted with DCM. Purification by $SiO_2$ column chromatography using DCM as the eluent gave a white solid as the product (150 mg, 65%).

$^1$H NMR (400 MHz, $CDCl_3$, ppm): δ 8.88 (d, 2H, J=4 Hz), 8.77 (s, 2H), 8.73 (s, 2H), 7.59 (d, 2H, J=4 Hz).

$C_{17}H_8BrF_6N_3$: m/z=448.98, MS: m/z=450.04 $[M+H]^|$.

4,4′,4″-Tris(trifluoromethyl)-2,2′,6′,2″-terpyridine (5). N-BuLi (3.6 ml, 9 mmol) was added dropwise to a solution of 2-bromo-4-trifluoromethylpyridine (1.0 ml, 8.1 mmol) in THF (50 ml) at −100° C. After 30 min at the same temperature, $ZnCl_2$ (1.1 g, 8.1 mmol) in THF (5 ml) was added dropwise. The reaction mixture was then left to warm up to room temperature. After 2 h, the reaction mixture was added to a THF solution (5 ml) of $Pd(PPh_3)_4$ (936 mg, 0.81 mmol) and 2,6-dichloro-4-trifluoromethylpyridine (0.46 ml, 3.24 mmol), and heated to 70° C. After 16 h, the reaction was cooled to room temperature, and 50 ml saturated EDTA solution (adjusted to PH=10) was added. The crude product was extracted with dichloromethane. The organic layer was dried over $Na_2SO_4$ and the solvent was removed. The remaining crude was purified by silica column chromatography (DCM:hexanes=1:1) to give a white solid (120 mg, 8.5%).

$^1$H NMR (400 MHz, $CDCl_3$, ppm): δ 8.93 (d, 2H, J=4 Hz), 8.81 (s, 4H), 7.64 (d, 2H, J=4 Hz).

$C_{18}H_8F_9N_3$: m/z=437.06, MS: m/z=438.21 $[M+H]^+$.

eDef-TpyRuCl$_3^{3+}$ (6). A suspension of (5) (100 mg, 0.23 mmol) and $RuCl_3$ hydrate (51.4 mg, 0.23 mmol) in 20 ml ethanol was heated at reflux for 3 h. The solvent was then evaporated to a volume of 5 ml; the mixture was filtered and the resulting precipitate was washed with diethyl ether, dried, and used directly for the next step.

eDef-RutpyBr. A suspension of (6) (50 mg, 0.077 mmol) and (4) (36 mg, 0.080 mmol) in 5 ml ethylene glycol was heated at 150° C. for 80 min (heating for too long will cause debromination). Then 10 ml saturated $KPF_6$ solution was added. The precipitate was collected by vacuum filtration and purified by silica column chromatography (MeCN:$H_2O$:saturated $KNO_3$(aq)=95:4:1). The first red bands were concentrated to 5 ml and saturated $KPF_6$ solution was added to give a red precipitate (30 mg, 30%).

$^1$H NMR (400 MHz, d$^3$-MeCN, ppm): δ 9.26 (s, 2H), 9.23 (s, 2H), 8.94 (s, 2H), 8.79 (s, 2H), 7.68 (d, 2H, J=4 Hz), 7.58 (d, 2H, J=4 Hz), 7.53 (d, 2H, J=4 Hz), 7.46 (d, 2H, J=4 Hz).

$C_{35}H_{16}BrF_{15}N_6Ru$: m/z=985.94, MALDI-TOF: m/z=986.35 $[M]^+$, 1131.55 $[M+PF_6]^+$.

Synthesis of $P_3Tpy$ ligand (7) was adapted from established synthetic procedures (see Duncan, T. V.; Ishizuka, T.; Therien, M. J. J. Am. Chem. Soc. 2007, 129, 9691). Note that in contrast to perfluoroalkylated tris(bipyridyl)Ru(II) complexes (see Furue, M.; Maruyama, K.; Oguni, T.; Naiki, M.; Kamachi, M. Inorg. Chem. 1992, 31, 3792), eDef-Rutpy species enable panchromatic chromophore design strategies that can take advantage of the RuPZn design motif that optimally mixes porphyrin ligand $\pi$-$\pi^*$ and (polypyridyl) metal charge transfer states (see RuPZn synthesis as described in yeda, H. T.; Zhao, Y. X.; Wostyn, K.; Asselberghs, I.; Clays, K.; Persoons, A.; Therien, M. J. J. Am. Chem. Soc. 2002, 124, 13806; Duncan, T. V.; Rubtsov, I. V.; Uyeda, H. T.; Therien, M. J. J. Am. Chem. Soc. 2004, 126, 9474; and Duncan, T. V.; Ishizuka, T.; Therien, M. J. J. Am. Chem. Soc. 2007, 129, 9691).

eDef-Rutpy. A suspension of (5) (20 mg, 0.046 mmol) and $RuCl_3$ hydrate (10.3 mg, 0.046 mmol) in 5 ml ethylene glycol was heated at reflux for 3 h. Then (7) (22 mg, 0.050 mmol) and 5 ml methanol were added and the mixture was refluxed for another 3 h. After that, 10 ml saturated $KPF_6$ solution was added. The precipitate was collected by vacuum filtration and purified by silica column chromatography ($MeCN:H_2O$:saturated $KNO_3$(aq)=95:4:1). The first red bands were concentrated to 5 ml and saturated $KPF_6$ solution was added to provide a red precipitate (9 mg, 20%).

$^1H$ NMR (400 MHz, $d^3$-MeCN, ppm): $\delta$ 9.28 (s, 4H), 8.95 (s, 4H), 7.63 (d, 4H, J=4 Hz), 7.52 (d, 4H, J=4 Hz).

$C_{36}H_{16}F_{18}N_6Ru$: m/z=976.02, MALDI-TOF: m/z=976.86 $[M]^+$, 1121.43 $[M+PF_6]^+$.

eDef-RuPZn. Perfluoroalkyl porphyrin ($Rf_3PZnETIPS$) (22.8 mg, 0.0215 mmol) in 50 ml THF was cooled down in an ice water bath. Tetra-n-butylammonium fluoride (25 ul, 0.025 mmol) was added to remove the triisopropylsilyl protecting-group of $Rf_3PZnETIPS$. After TLC showed completion of the reaction, the solvent was removed and $Rf_3PZnE$ was chromatographed on silica (THF:hexanes=95:5). A 100 mL Schlenk flask equipped with a stirbar was charged with $Rf_3PZnE$ (from 22.8 mg $Rf_3PZnETIPS$), eDef-RutpyBr (25 mg, 0.0196 mmol), $Pd_2(dba)_3$ (3.6 mg, 0.004 mmol) and $AsPh_3$ (6 mg, 0.0196 mmol) under Ar, following which 20 ml THF, 20 ml acetonitrile and 4 ml diisopropylamine were mixed together and added after being degassed by 3 freeze-pump-thaw cycles. The mixture was heated at 60° C. overnight. When the reaction was complete, most of the solvent was removed. A small amount of acetonitrile was added to dissolve the mixture. Saturated $KPF_6$ aqueous solution was added to precipitate the product. The crude product was filtered and dried. The compound was then purified by silica gel chromatography ($MeCN:H_2O$:saturated $KNO_3$ (aq)=96:3:1). eDef-RuPZn was collected, and the eluent evaporated to a volume of 30 ml; saturated ammonium hexafluorophosphate was added to precipitate the product, which was then filtered and dried to give a brownish solid (21 mg, %, based on eDef-RutpyBr).

$^1H$ NMR (400 MHz, $d^3$-MeCN, ppm): $\delta$ 10.32 (d, 2H, J=6 Hz), 9.79 (s, 2H), 9.73 (s, 2H), 9.67 (m, 4H), 9.32 (s, 2H), 9.13 (s, 2H), 9.00 (s, 2H), 7.85 (d, 2H, J=6 Hz), 7.67 (d, 2H, J=6 Hz), 7.61 (d, 2H, J=6 Hz), 7.57 (d, 2H, J=6 Hz).

$C_{66}H_{24}F_{36}N_{10}RuZn$: m/z=1805.99, MALDI-TOF: m/z=1806.64 $[M]^+$, 2096.33 $[M+2PF_6]^+$.

Synthetic Materials: All manipulations were performed under argon prepurified by passing through an $O_2$ scrubbing tower packed with Schweizerhall R3-11 catalyst and a drying tower packed with Linde 3 Å molecular sieves. Air-sensitive solids were weighed in a Braun 150-M glove box. Standard Schlenk techniques were employed to manipulate air-sensitive solutions. Tetrahydrofuran (THF) was purchased from Sigma-Aldrich (Inhibitor free, HPLC grade) and distilled over sodium and benzophenone before use. Diisopropylamine was purchased from Sigma-Aldrich. All other solvents utilized in synthesis described in this work were purchased from Fisher Scientific (HPLC grade). Acetonitrile were dried over calcium hydride and distilled. All other reagents were used as received (Aldrich or Fisher).

Instrumentation

A 400 MHz Brüker spectrometer was used to obtain NMR spectra for all synthesized compounds. Chemical shifts for $^1H$ NMR spectra are reported relative to residual protium in deuterium solvent ($\delta$(residual)=7.26 ppm in $CDCl_3$, $\delta$(residual)=1.94 ppm in $d^3$-MeCN). All J values are reported in Hertz. Reported MALDI-TOF data were acquired with an Applied Biosystems DE-Pro Maldi-MS at the Department of Chemistry in Duke University. Samples were prepared as micromolar solutions in acetone, using HABA (2-(4-Hydroxyphenylazo)benzoic acid) as the matrix. Reported MS data were acquired with an Agilent LC/MSD Trap at the Department of Chemistry in Duke University. Electronic absorption spectra were acquired on a Shimadzu Pharmaspec UV-1700 spectrometer.

Figure 6:
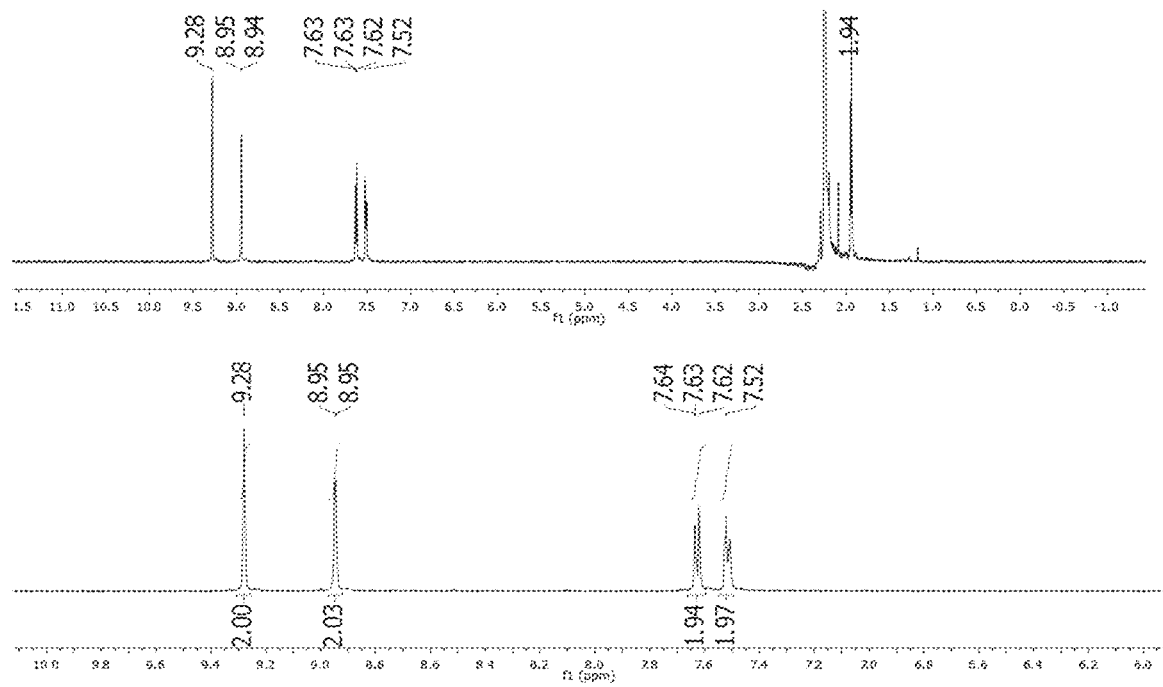
FIG. 6 shows Proton NMR spectrum of eDef-Rutpy in CD$_3$CN.
Figure 7:
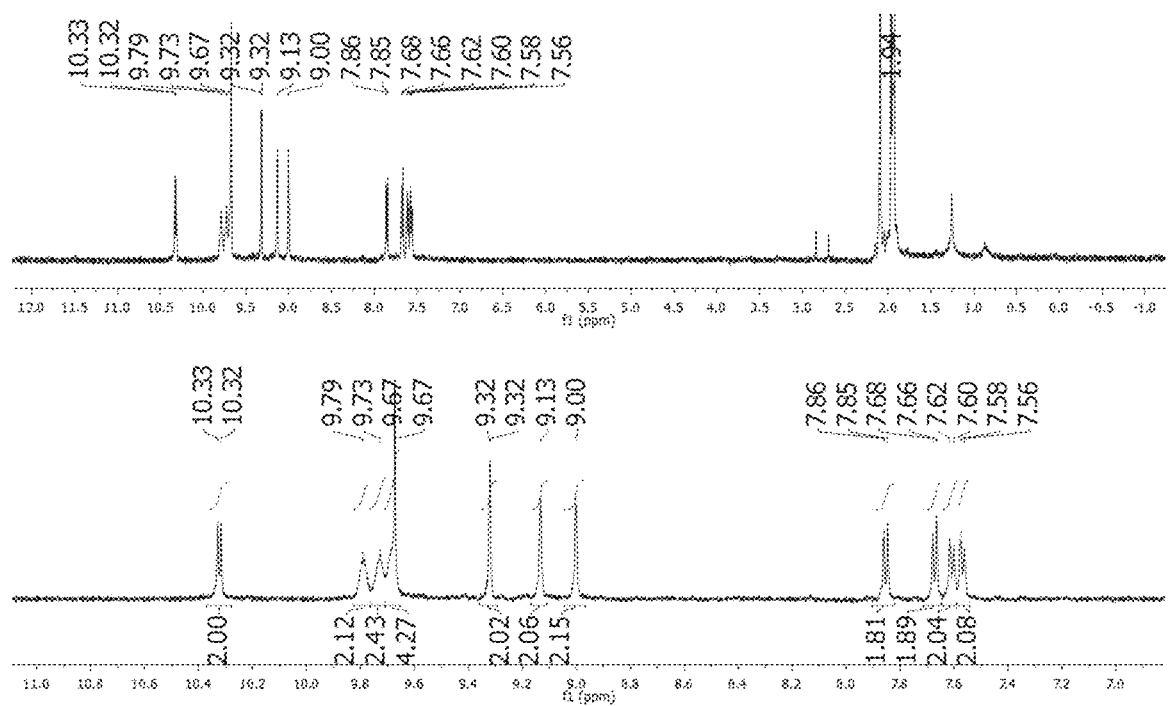
FIG. 7 shows Proton NMR spectrum of eDef-RuPZn in CD$_3$CN.

FIG. 6 shows Proton NMR spectrum of eDef-Rutpy in $CD_3CN$; and FIG. 7 shows Proton NMR spectrum of eDef-RuPZn in $CD_3CN$.

Figure 8:
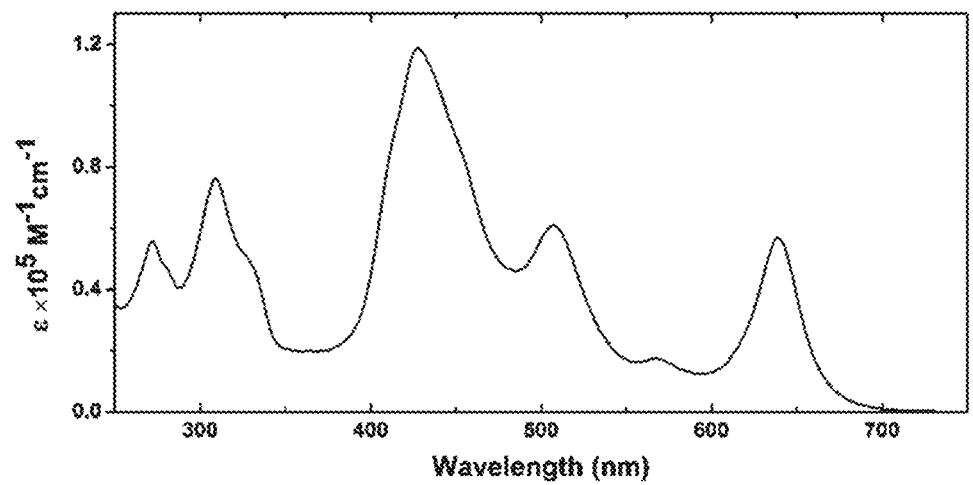
FIG. 8 shows Electronic absorption spectrum of RuPZn in acetonitrile solvent.

FIG. 8 shows Electronic absorption spectrum of RuPZn in acetonitrile solvent.

Figure 9:
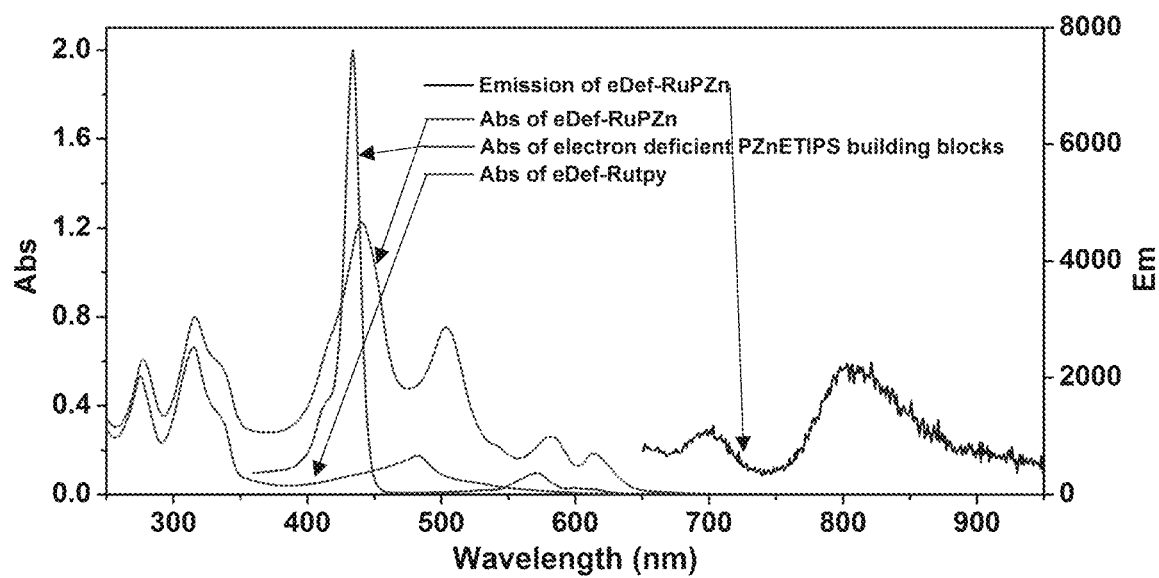
FIG. 9 shows Electronic absorption spectra of eDef-RuPZn (in MeCN), eDef-Rutpy (in MeCN) and [5-ethynyl-10,15,20-tris(heptafluoropropyl)porphinato]zinc(II) (in THF) building blocks; and room-temperature emission spectra (fluorescence at 700 nm and phosphorescence at 810 nm, excitation wavelength=628 nm) of eDef-RuPZn in acetonitrile solvent.

FIG. 9 shows Electronic absorption spectra of eDef-RuPZn (in MeCN), eDef-Rutpy (in MeCN) and [5-ethynyl-10,15,20-tris(heptafluoropropyl)porphinato]zinc(II) (in THF) building blocks; and room-temperature emission spectra (fluorescence at 700 nm and phosphorescence at 810 nm, excitation wavelength=628 nm) of eDef-RuPZn in acetonitrile solvent; the sample was degassed via three freeze-pump-thaw cycles prior to data collection.

Figure 10A:
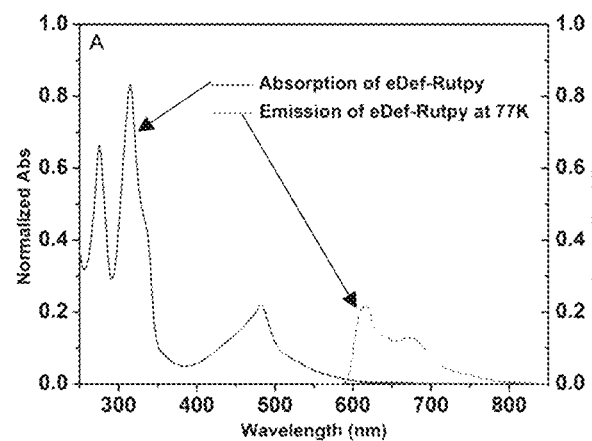
FIG. 10A shows a 77K Emission spectrum (excitation wavelength=510 nm) of eDef-Rutpy in butyronitrile, and the absorption spectrum of eDef-Rutpy at RT (room temperature) in acetonitrile.
Figure 10B:
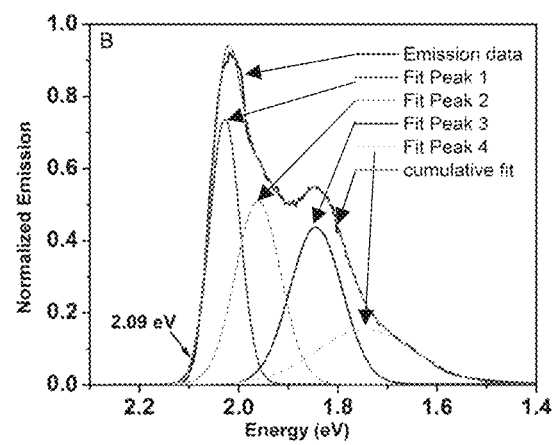
FIG. 10B shows a Gaussian fitting of the 77K emission data of FIG. 10A, with labeled energy (2.09 eV) at which the emission intensity is 10% that of the highest emission intensity

FIG. 10A shows a 77K Emission spectrum (excitation wavelength=510 nm) of eDef-Rutpy in butyronitrile, and the absorption spectrum of eDef-Rutpy at RT (room temperature) in acetonitrile; FIG. 10B shows a Gaussian fitting of the 77K emission data of FIG. 10A, with labeled energy (2.09 eV) at which the emission intensity is 10% that of the highest emission intensity.

Figure 11:
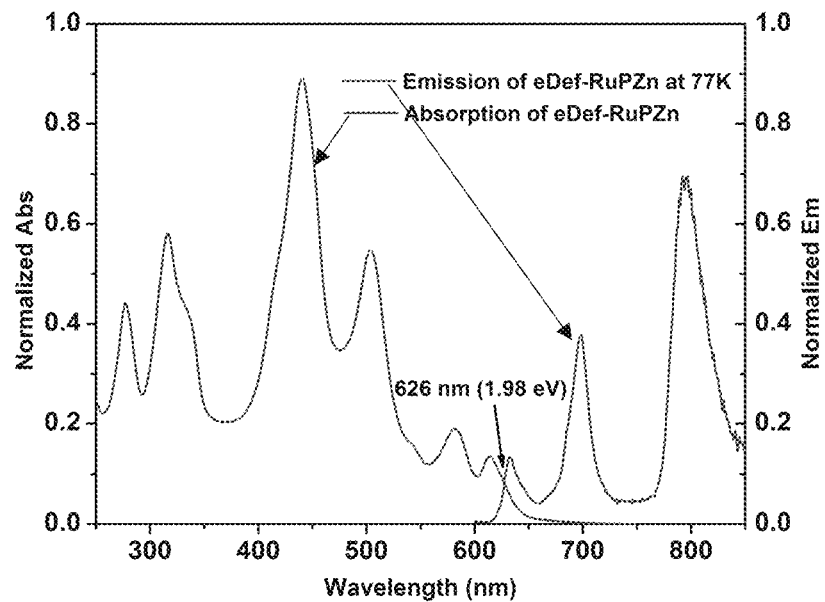
FIG. 11 shows a 77K emission spectrum (fluorescence at 600750 nm and phosphorescence at 750850 nm, excitation wavelength=590 nm) of eDef-RuPZn in butyronitrile, and the absorption spectrum of eDef-RuPZn in acetonitrile.

FIG. 11 shows a 77K emission spectrum (fluorescence at 600750 nm and phosphorescence at 750~850 nm, excitation wavelength=590 nm) of eDef-RuPZn in butyronitrile, and the absorption spectrum of eDef-RuPZn in acetonitrile. As can be seen from FIG. 11, the intersection point of the absorption and emission spectra is at 626 nm.

FIG. 12A shows plots of a room-temperature (RT) emission spectrum (excitation wavelength=628 nm) of eDef-RuPZn in deaerated acetonitrile solvent, 77K emission spectrum (excitation wavelength=628 nm) of eDef-RuPZn in butyronitrile, along with the absorption spectrum of eDef-RuPZn in acetonitrile. FIG. 12B shows Gaussian fitting of the RT emission data of FIG. 12A, with labeled energy (1.65 eV) at which the emission intensity is 10% that of the highest emission intensity. FIG. 12C shows Gaussian fitting of the 77K emission data of FIG. 12A on energy scale, with labeled energy (1.61 eV) at which the emission intensity is 10% that of the highest emission intensity.

Cyclic voltammetry and differential pulse voltammetry experiments were performed on a BASi EC Epsilon working station, using an Ag/AgCl (3M NaCl) reference electrode, a Pt wire counter electrode, and a glassy carbon working electrode. The ferrocene/ferrocenium redox couple (0.43 V vs. SCE, 0.67 V vs. NHE) was used as an internal standard.

FIG. 13 shows potentiometric data of eDef-Rutpy (vs. SCE) in 0.1 M $TBAPF_6$/acetonitrile electrolyte/solvent system. The plots show the cyclic voltammetric response and the differential pulse voltammetry (DPV) measurement.

FIG. 14 shows potentiometric data of eDef-RuPZn (vs. SCE) in 0.1 M TBAPF$_6$/acetonitrile electrolyte/solvent system. The plots show the cyclic voltammetric response and the DPV measurement. Reported redox potential values correspond to those obtained from the DPV experiment.

Figure 15:
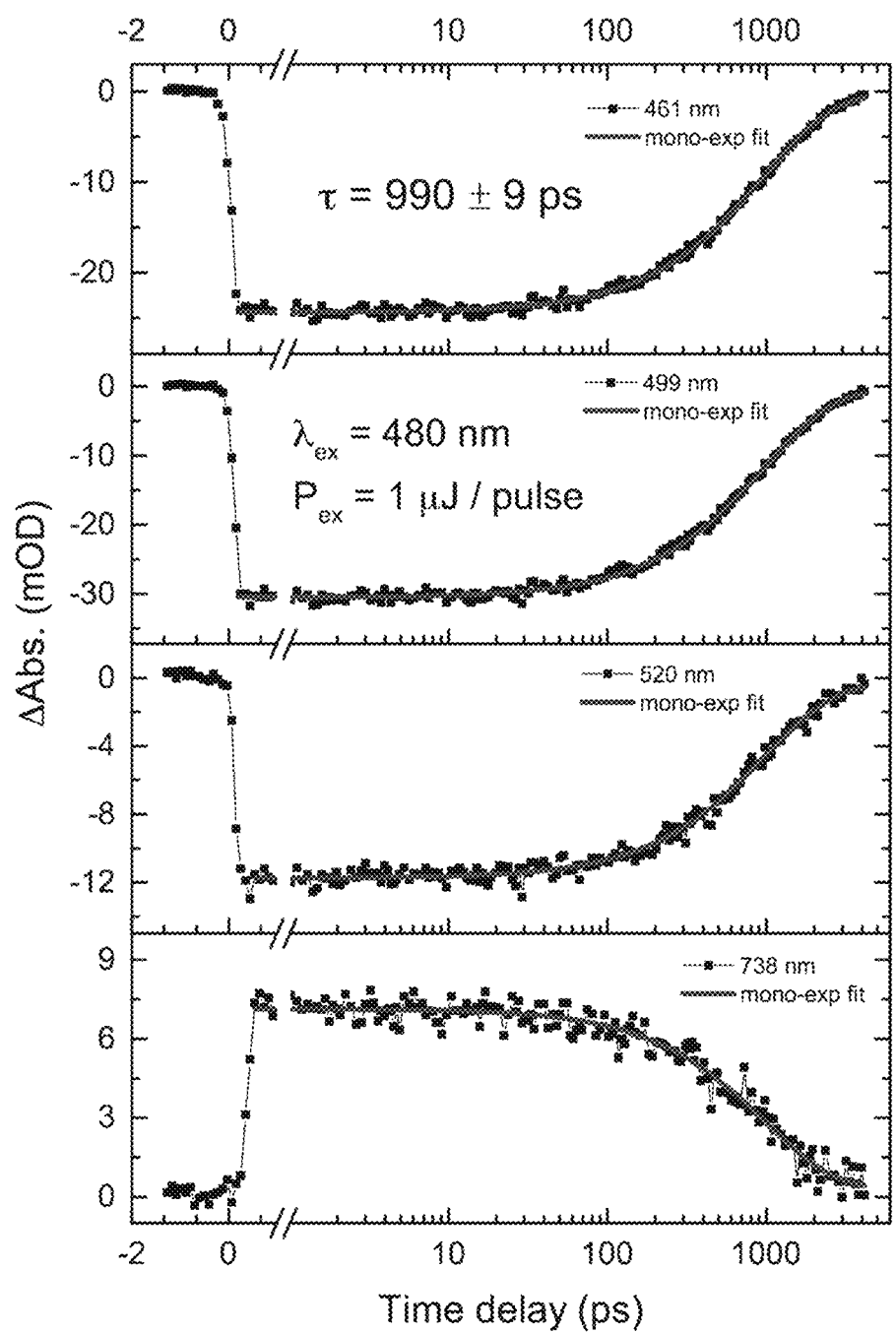
FIG. 15 shows representative time traces (black) from femtosecond pump-probe transient absorption of eDef-Rutpy in acetonitrile solvent for 461 nm, 499 nm, 520 nm, and 738 nm wavelengths.

Femtosecond-to-Nanosecond Timescale Pump-Probe Transient Absorption Spectroscopy FIG. 15 shows representative time traces (black) from femtosecond pump-probe transient absorption of eDef-Rutpy in acetonitrile solvent for 461 nm, 499 nm, 520 nm, and 738 nm wavelengths. A global fit to the dynamics indicates a mono-exponential lifetime of ~1 ns. Experimental conditions for these plots: Magic angle polarization, T=21° C., pump power=1 µJ/pulse, Excitation wavelength=480 nm.

Figure 16:
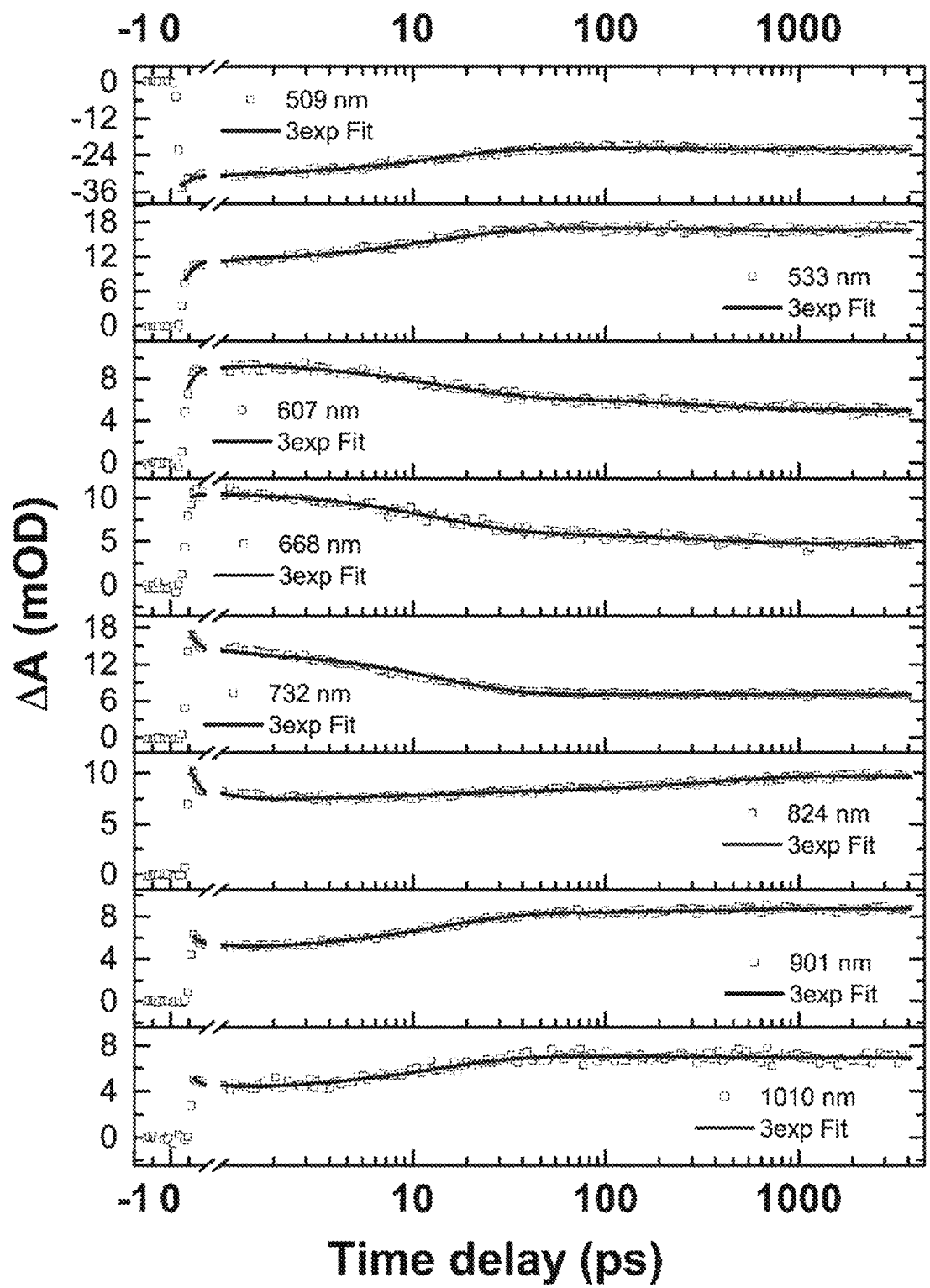
FIG. 16 shows representative time traces (black circles) from femtosecond pump-probe transient absorption of eDef-RuPZn in acetonitrile solvent for 509 nm, 533 nm, 607 nm, 668 nm, 732 nm, 824 nm, 901 nm, and 1010 nm wavelengths.
Figure 17:
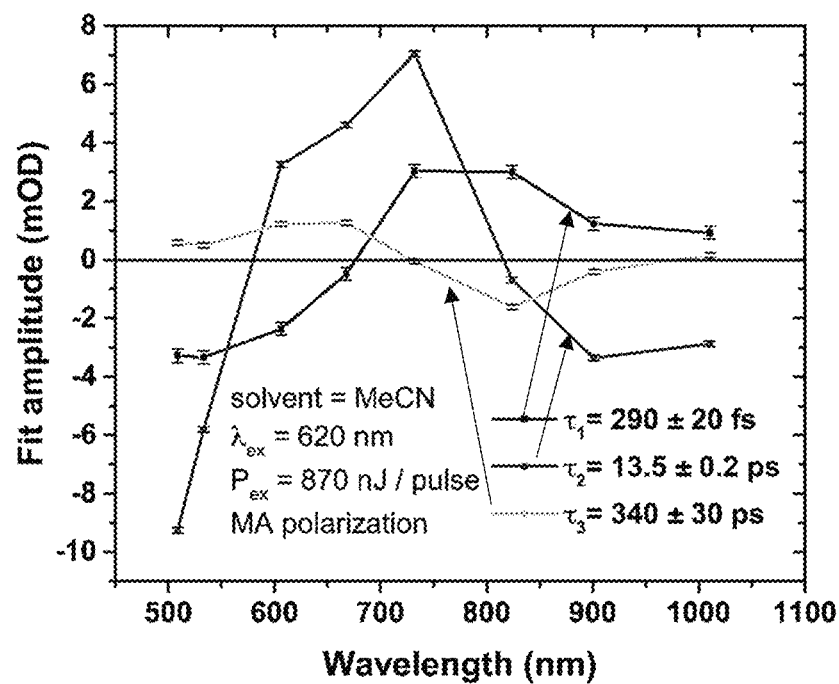
FIG. 17 shows plots of decay-associated difference spectra (DADS) of eDef-RuPZn derived from a global fit of pump-probe transient absorption data from FIG. 13 in acetonitrile solvent; the lifetimes associated with each spectrum are labeled in the inset. $\tau_1$=290 fs corresponds to the solvent relaxation timescale; $\tau_2$=13.5 ps is the timescale of $S_1 \to T_1$ intersystem crossing (ISC), characterized by a rise (negative fit amplitude) in transient absorption in the NIR; The small-amplitude, longer-timescale time constant, $\tau_3$=340 ps, is assigned to structural relaxation of the long-lived $T_1$ state of eDef-RuPZn.

FIG. 16 shows representative time traces (black circles) from femtosecond pump-probe transient absorption of eDef-RuPZn in acetonitrile solvent for 509 nm, 533 nm, 607 nm, 668 nm, 732 nm, 824 nm, 901 nm, and 1010 nm wavelengths. FIG. 17 shows plots of decay-associated difference spectra (DADS) of eDef-RuPZn derived from a global fit of pump-probe transient absorption data from FIG. 13 in acetonitrile solvent. In FIG. 16, each time trace is shown with its corresponding global fit to the dynamics, and time constants are as shown in FIG. 17. In FIG. 16, the signal at long-time-delay derives from $T_1 \rightarrow T_N$ transient absorption from the long-lived triplet state. Experimental conditions for these plots: Magic angle polarization, T=21° C., pump power=870 nJ/pulse, Excitation wavelength=620 nm.

Ultrafast transient absorption spectra were obtained using standard pump-probe methods, such as described by Rubtsov, I. V.; Susumu, K.; Rubtsov, G. I.; Therien, M. J. *J. Am. Chem. Soc.* 2003, 125, 2687; Park, J.; Deria, P.; Therien, M. J. *J. Am. Chem. Soc.* 2011, 133, 17156; and Park, J.; Deria, P.; Olivier, J. H.; Therien, M. J. *Nano Lett.* 2014, 14, 504. Optical pulses (≥120 fs) centered at 775 nm, were generated using a Ti:Sapphire laser (Clark-MXR, CPA-2001, Dexter, Mich., USA), which consisted of a regenerative amplifier seeded by a mode-locked fiber oscillator. The output of the regenerative amplifier was split to feed an optical parametric amplifier (Light Conversion Ltd., TOPAS-C, Vilnius, Lithuania), which generates excitation pulses tunable in wavelength from the UV through the NIR region. The pump beam was chopped at half the laser repetition rate (~500 Hz). A fraction (<5%) of the output from the regenerative amplifier was passed through an optical delay line, and focused onto a 2 mm c-cut sapphire plate to generate a white light continuum, which was used as the probe beam. The polarization and attenuation of the pump and probe beams were controlled by half-wave plate and Rochon prism polarizer pairs. The polarization was set to the magic angle (54.7°) for these experiments.

The pump beam was focused into the sample cell with an f=20 cm lens, while the probe beam was focused with a parabolic mirror. The pump spot size diameter was ~0.3 mm. The beam diameter was determined using the razor-blade method. The excitation pump power was measured using a power meter (Coherent, LabMax Top with PS19 head). After passing through the sample, the probe light was adjusted using a neutral density filter to avoid saturating the detector, and focused onto the entrance slit of a computer-controlled image spectrometer (Acton Research Corporation, SpectraPro-150, Trenton, N.J., USA). A CCD array detector (1024×128 elements, Roper Scientific, Trenton, N.J., USA), interfaced to the spectrometer, recorded the spectrum of the probe light from the UV (~370 nm) to the NIR (~1100 nm), providing spectral resolution better than 0.5 nm. Pairs of consecutive spectra were measured with $I_{on}(\lambda)$ and $I_{off}(\lambda)$ to determine the difference spectrum, $\Delta A = \log(I_{off}(\lambda)/I_{on}(\lambda))$. All these experiments utilized a custom-built 2 mm-pathlength fused-silica sample cell; all transient optical studies were carried out at 21±1° C. in HPLC grade acetonitrile solvent received from Sigma-Aldrich. All transient spectra reported represent averages obtained over 3-5 scans, with each scan consisting of ~300 time delays spaced on a log scale, with each time delay an average of 3,000 frames.

In these experiments, the optical delay line utilizes a computer-controlled delay stage. Delay times up to 4 ns were achieved using a Compumotor-6000 (Parker). The baseline noise level in these transient absorption experiments corresponded to ~0.2 mOD per second of signal accumulation. The time resolution is probe-wavelength dependent; in these experiments, the FWHM of the instrument response function (IRF) varied between 140-200 fs (e.g., at 680 nm, the IRF was 150±6 fs). Following all pump-probe transient absorption experiments, electronic absorption spectra verified that the samples were robust. All reported pump-probe experiments were repeated at least three times with separately prepared samples.

Figure 18:
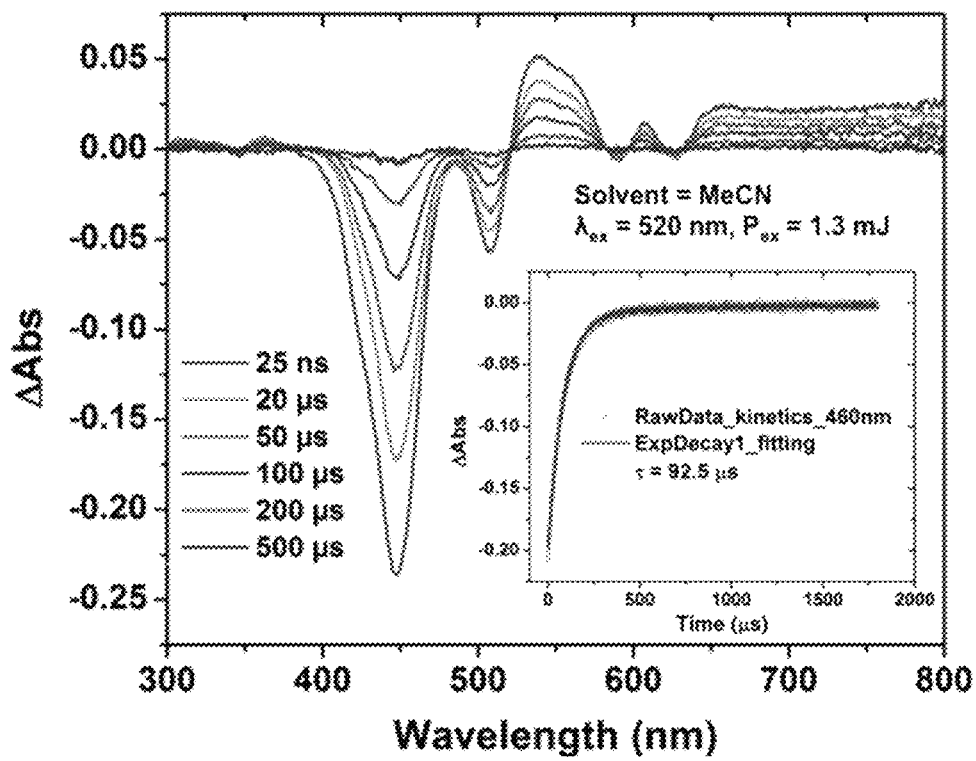
FIG. 18 shows a plot of nanosecond pump-probe transient absorption spectra of eDef-RuPZn in acetonitrile solvent following excitation at 520 nm; inset shows kinetics at a representative wavelength overlaid with single-exponential fit ($\tau$=92.5 μs).

Nanosecond-to-Microsecond Timescale Pump-Probe Transient Absorption Spectroscopy FIG. 18 shows a plot of nanosecond pump-probe transient absorption spectra of eDef-RuPZn in acetonitrile solvent following excitation at 520 nm. The inset shows kinetics at a representative wavelength overlaid with single-exponential fit (τ=92.5 ps).

Nanosecond transient absorption spectra were acquired utilizing an Edinburgh Instruments LP920 Laser Flash Photolysis Spectrometer and Edinburgh L900 Software. Pump pulses were generated from a Q-switched Nd:YAG laser (Quantel, Brilliant) and a dual-crystal OPO (OPOTEK, Vibrant LDII). The temporal width of the pump pulses was ~5 ns; the energy of the pulses exiting the OPO was controlled using neutral density filters. A Xe flash-lamp was used as a white light probe source, and a CCD array detector enabled acquisition of transient data over the 400-800 nm wavelength domain. A PMT detector coupled to an oscilloscope allowed for high-resolution data acquisition in "kinetic mode." Both the LP920 and Opotek OPO are computer interfaced and controlled by the L900 software. Transient spectra reported derive from data acquired over ~20-50 scans. Samples were prepared in 1 cm quartz cells and de-aerated by 3 freeze-pump-thaw degas cycles prior to excitation. Excited-state lifetimes were calculated via monoexponential fitting using Origin 9.1 software.

Time-Resolved Emission Spectroscopy

Figure 19:
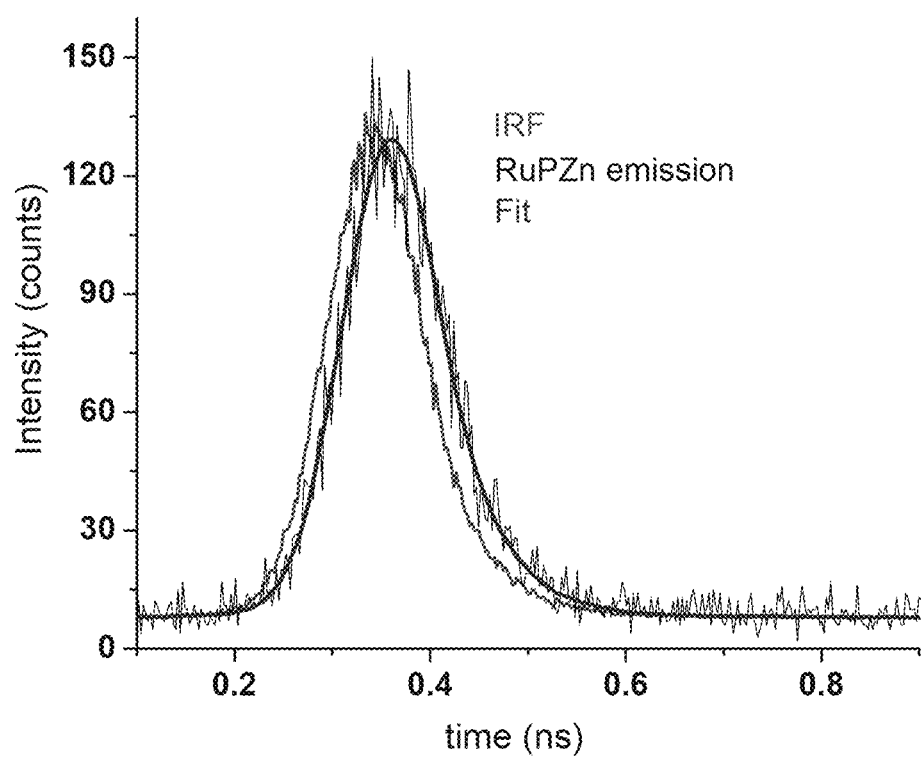
FIG. 19 shows a time-resolved emission of RuPZn in acetonitrile solvent with its fit to a mono-exponential function convoluted with the experimentally determined instrument response function (IRF).

FIG. 19 shows a time-resolved emission of RuPZn in acetonitrile solvent with its fit to a mono-exponential function convoluted with the experimentally determined instrument response function (IRF). Magic-angle polarization time-resolved emission data were recorded using a Hamamatsu C4780 picosecond fluorescence lifetime measurement system, which utilizes a Hamamatsu Streakscope C4334 photoncounting detector, a Hamamatsu C4792-01 synchronous delay generator, and a Stanford Research Systems DG535 electronic delay generator. RuPZn was excited by a Hamamatsu PLP-10 laser diode (405 nm), and the polarization of emission was set to the magic angle (54.7°) for these experiments. Hamamatsu HPD-TA software was used to acquire emission data in the single-photon counting mode, and its fitting module was used to fit the emission lifetime by deconvolution with the experimentally determined instrument response function (irf). The irf was measured using a scattering sample (cream dissolved in water or silica in water). Sample concentrations were adjusted to give an optical density of 0.1 at the excitation wavelength. The time constant from this fit is 18±1 ps, which is identical to the rise time of the transient absorption signal in the near-IR measured via pump-probe spectroscopy. Because of the completely analogous spectra and dynamics of ED-RuPZn, we assign the 13.5 ps rise time of the transient absorption signal in the near-IR to $S_1 \rightarrow T_1$ intersystem crossing of this electron-deficient supermolecule. Experimental conditions: excitation wavelength=650 nm, magic angle polarization, T=20° C., emission intensity was integrated over the 670-740 nm spectral window.

Calculation of Excited State Redox Potentials

Redox potentials of eDef-Rutpy and eDef-RuPZn $S_1$ and $T_1$ states were calculated from respective $E_{0,0}$ energies and ground state redox potentials, such as described by Turro, N. J. *Principles of Modern Molecular Photochemistry*; University Science Books: Sausolito, Calif., 2009.

The experimental conditions involved: 0.1 M TBAPF$_6$/acetonitrile electrolyte/solvent system; ambient temperature; potential vs. NHE; SnO$_2$ conduction band (cyan shadow, onset=0 V) at neutral pH.

eDef-Rutpy is non-emissive at room temperature, but is emissive at 77K. Similar to other Ru(II) polypyridyl complexes, the forbidden $S_0 \rightarrow ^3$MLCT transition of eDef-Rutpy is weak and observed as a low-energy tail in the electronic absorption spectrum (see Roundhill, D. M. In *Photochemistry and Photophysics of Metal Complexes*; Springer US: Boston, Mass., 1994). Due to intensity scaling ambiguities, the $T_1$ state $E_{0,0}$ energy of eDef-Rutpy is not acquired from the intersection point of the $S_0 \rightarrow ^3$MLCT absorption and $^3$MLCT$\rightarrow S_0$ emission, but rather is estimated from the $^3$MLCT emission energy corresponding to 10% intensity of that of the highest energy emission maximum (the "10% rule"), assuming a Gaussian emission shape (see Dossing, A.; Ryu, C. K.; Kudo, S.; Ford, P. C. *J. Am. Chem. Soc.* 1993, 115, 5132; and McClure, L. J.; Ford, P. C. *J. Phys. Chem.* 1992, 96, 6640). Thus the $T_1$ state $E_{0,0}$ energy of eDef-Rutpy is estimated as 2.09 eV (see FIG. 10B).

$$^3e\text{Def-Rutpy}^{-/*} = e\text{Def-Rutpy}^{-/0} + E_{0,0} = 0.48 + 2.09 = 1.61\ V$$

$$^3e\text{Def-Rutpy}^{*/|} = e\text{Def-Rutpy}^{0/|} - E_{0,0} = 2.05 - 2.09 = -0.04\ V$$

The band centered at 700 nm of the emission spectrum of eDef-RuPZn is unaffected by aeration, indicative of $S_1 \rightarrow S_0$ fluorescence. The intensity of the band peaked at 810 nm is reduced when the sample is aerated, relative to a corresponding deaerated sample; as such, this emission band corresponds to $T_1 \rightarrow S_0$ phosphorescence.

The $S_1$ state $E_{0,0}$ energy of eDef-RuPZn is determined by the intersection of the lowest energy absorption and fluorescence bands: $E_{0,0}(S_1)$=626 nm=1.98 eV (see FIG. 11).

$$^1e\text{Def-RuPZn}^{-/*} = e\text{Def-RuPZn}^{-/0} + E_{0,0}(S_1) = 0.39 + 1.98 = 1.59\ V$$

$$^1e\text{Def-RuPZn}^{*/+} = e\text{Def-RuPZn}^{0/+} - E_{0,0}(S_1) = 1.63 - 1.98 = -0.35\ V$$

The $T_1$ state $E_{0,0}$ energy of eDef-RuPZn is assigned according to the "10% rule" discussed above with the 77K emission spectrum: $E_{0,0}(T_1)$=1.61 eV (see FIG. 12C). With $E_{0,0}$=1.61 eV, the $^3E^{*/+}$=−0.02 eV and is slightly (0.02 eV) more positive than the conduction band onset of SnO$_2$. However, the spectral breadth of eDef-RuPZn phosphorescence at RT (see FIGS. 12A and 12B) suggests injection into SnO$_2$ is possible at RT with $^3E^{*/+}$=−0.02 eV.

$$^3e\text{Def-RuPZn}^{-/*} = e\text{Def-RuPZn}^{-/0} + E_{0,0}(T_1) = -0.39 + 1.65 = 1.26\ V$$

$$^3e\text{Def-RuPZn}^{*/+} = e\text{Def-RuPZn}^{0/+} - E_{0,0}(T_1) = 1.63 - 1.65 = -0.02\ V$$

As described by the example, a highly electron-deficient Ru(II) complex (eDef-Rutpy) is synthesized and shown bearing an $E_{1/2}^{0/+}$ potential more than 300 mV more positive than that of any established Ru(II) bis(terpyridyl) derivative. In addition, an ethyne-bridged eDef-Rutpy-(porphinato)Zn(II) (eDef-RuPZn) supermolecule is synthesized that affords both panchromatic UV-vis spectral domain absorptivity and a high $E_{1/2}^{0/+}$ potential, comparable to that of Ce(NH$_4$)$_2$(NO$_3$)$_6$ [$E_{1/2}$(Ce$^{3+/4+}$)=1.61 V vs. NHE], a strong and versatile ground-state oxidant commonly used in organic functional group transformations. As further shown, eDef-RuPZn exhibits eight-fold greater absorptive oscillator strength over the 380-700 nm range relative to conventional Ru(II) polypyridyl complexes, and impressive excited-state reduction potentials ($^1E^{-/*}$=1.59 V; $^3E^{-/*}$=1.26 V). eDef-RuPZn manifests electronically excited singlet and triplet charge-transfer state lifetimes more than two orders of magnitude longer than those typical of conventional Ru(II) bis(terpyridyl) chromophores, which is beneficial for light-driven oxidation reactions for energy conversion and photocatalysis.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. In addition, any elements or limitations of any invention or embodiment thereof disclosed herein can be combined with any and/or all other elements or limitations (individually or in any combination) or any other invention or embodiment thereof disclosed herein, and all such combinations are contemplated with the scope of the invention without limitation thereto.

Any patents or publications mentioned in this specification are indicative of the levels of those skilled in the art to which the invention pertains. These patents and publications are herein incorporated by reference to the same extent as if each individual publication was specifically and individually indicated to be incorporated by reference.

It should be understood that the examples and embodiments described herein are for illustrative purposes only and that various modifications or changes in light thereof will be suggested to persons skilled in the art and are to be included within the spirit and purview of this application. One skilled in the art will readily appreciate that the present invention is well adapted to carry out the objects and obtain the ends and advantages mentioned, as well as those inherent therein. The present examples along with the methods described herein are presently representative of preferred embodiments, are exemplary, and are not intended as limitations on the scope of the invention. Changes therein and other uses will occur to those skilled in the art which are as defined by the scope of the claims.

What is claimed is:

1. A compound of a formula comprising:

A-L-B wherein:
   A is a conjugated macrocycle bearing electron withdrawing substituents or is electron-accepting relative to hydrogen;

B is a metal complex bearing electron withdrawing substituents or is electron-accepting relative to hydrogen; and L is ethynyl, vinyl, thiophenyl, diethynylaryl, divinylaryl, diethynyl(unsaturated heterocycloalkenyl), divinyl(unsaturated heterocycloalkenyl), diethynyl(unsaturated heterocycloalkynyl), or divynyl(unsaturated heterocycloalkynyl).

2. The compound of claim 1, wherein the macrocycle of the conjugated macrocycle is porphyrin, porphycene, rubyrin, rosarin, hexaphyrin, sapphyrin, chlorophyl, chlorin, phthalocyanine, porphyrazine, bacteriochlorophyl, pheophytin, or texaphyrin.

3. The compound of claim 1, wherein the conjugated macrocycle is a porphyrin complexed to metal atom $M_1$.

4. The compound of claim 3, wherein $M_1$ is Zn, Mg, Cr, Fe, Co, Ni, Cu, Zr, Nb, Mo, Ru, Rh, Pd, Cd, Ge, Sn, Hf, Ta, W, Re, Os, Ir, Pt, Au, or Pb.

5. The compound of claim 1, wherein A is a conjugated macrocycle bearing an electron withdrawing substituent of perfluoroalkyl or perfluoroaryl.

6. The compound of claim 1, wherein the metal complex is a (polypyridyl)metal species.

7. The compound of claim 6, wherein a polypyridyl ligand of the (polypyridyl)metal species is terpyridyl or bipyridyl.

8. The compound of claim 1, wherein the metal complex is a (poly-heterocyclic)metal species.

9. The compound of claim 1 wherein the metal complex is neutral.

10. The compound of claim 1, wherein the metal complex is charged.

11. The compound of claim 1, wherein the metal complex comprises a transition metal.

12. The compound of claim 1, wherein the metal complex comprises a Group 8 transition metal.

13. The compound of claim 1, wherein the metal complex comprises Fe, Ru, Os, Re, Ir, Rh, or Pt.

14. The compound of claim 1, wherein L is ethynyl.

15. The compound of claim 1, wherein the formula is

A-L-B.

16. The compound of claim 1, wherein the formula is

A-L-B-L-A.

17. The compound of claim 1, wherein the formula is

B-L-A-L-B.

18. The compound of claim 1, wherein A is eDef-Rutpy-(porphinato)Zn(II), B is eDef-RuPZn, and L is ethyne.

19. A compound of a formula comprising:

A-L-B wherein:

A is a conjugated macrocycle bearing electron withdrawing substituents or is electron-accepting relative to hydrogen;

B is a metal complex bearing electron withdrawing substituents or is electron-accepting relative to hydrogen; and L is ethynyl, diethynylaryl, diethynyl(unsaturated heterocycloalkenyl), or diethynyl(unsaturated heterocycloalkynyl).

20. A compound of a formula comprising:

A-L-B wherein:

A is a conjugated macrocycle bearing an electron withdrawing substituent selected from the group consisting of fluoroaryl, fluoroalkyl, fluoro, halo, cyano, and nitro;

B is a metal complex bearing an electron withdrawing substituent selected from the group consisting of fluoroaryl, fluoroalkyl, fluoro, halo, cyano, and nitro; and L is ethynyl, vinyl, thiophenyl, diethynylaryl, divinylaryl, diethynyl(unsaturated heterocycloalkenyl), divinyl(unsaturated heterocycloalkenyl), diethynyl(unsaturated heterocycloalkynyl), or divynyl(unsaturated heterocycloalkynyl).

\* \* \* \* \*